(12) United States Patent
Becker et al.

(10) Patent No.: US 10,779,616 B2
(45) Date of Patent: Sep. 22, 2020

(54) THREE-DIMENSIONAL THERMO-MOLDING OF FOOTWEAR

(71) Applicant: adidas AG, Herzogenaurach (DE)

(72) Inventors: Ronald Daniel Becker, Portland, OR (US); Edward John Musho, Portland, OR (US); Charles Griffin Wilson, III, Portland, OR (US); Robert Leimer, Portland, OR (US); Howard Hunter Barney, Portland, OR (US); Nicholas Allen Groeneweg, Portland, OR (US); Ian James Hennebery, Portland, OR (US); Kelli Amelia George, Portland, OR (US); Alistair Hather, Portland, OR (US); Carl Arnese, Portland, OR (US); Jacques Perrault, Portland, OR (US)

(73) Assignee: adidas AG, Herzogenaurach (DE)

( * ) Notice: Subject to any disclaimer, the term of this patent is extended or adjusted under 35 U.S.C. 154(b) by 464 days.

(21) Appl. No.: 15/156,062

(22) Filed: May 16, 2016

(65) Prior Publication Data

US 2017/0325545 A1     Nov. 16, 2017

(51) Int. Cl.
*A43B 23/02* (2006.01)
*B29D 35/12* (2010.01)
(Continued)

(52) U.S. Cl.
CPC .............. *A43B 23/026* (2013.01); *A43B 7/14* (2013.01); *A43B 23/028* (2013.01);
(Continued)

(58) Field of Classification Search
CPC ....... A43B 23/026; A43B 7/14; A43B 23/028; A43B 23/0215; A43B 23/07; B29D 35/0072; B29D 35/126; A43D 3/04
See application file for complete search history.

(56) References Cited

U.S. PATENT DOCUMENTS 2,515,050 A * 7/1950 Hollier ................ A43B 3/02
                                                  12/142 E
3,444,590 A   5/1969 Ludwig
(Continued)

FOREIGN PATENT DOCUMENTS

CA         2330517 C     1/2005
EP       2 805 638 A1   11/2014
(Continued)

*Primary Examiner* — Katharine Gracz
(74) *Attorney, Agent, or Firm* — Sterne, Kessler, Goldstein & Fox P.L.L.C.

(57) ABSTRACT

Methods for manufacturing uppers for articles footwear that include thermo-forming an upper composed of one or more low melting point thermoplastic polymers. The methods may include disposing a skin for forming an upper over and inflatable bladder. The skin may include at least one of a base layer composed of a low melting point thermoplastic polymer and a grid layer including a yarn composed of a low melting point thermoplastic polymer. The skin and inflatable bladder may be placed into a mold cavity and the mold may be heated to a predetermined temperature. The inflatable bladder may be inflated such that the skin is pressed against an interior surface of the heated mold cavity to cause the skin to take on the shape of the internal surface of the mold cavity, thereby forming an upper for an article of footwear.

16 Claims, 15 Drawing Sheets

(51) Int. Cl.
  *B29K 75/00* (2006.01)
  *A43D 3/04* (2006.01)
  *A43B 23/07* (2006.01)
  *A43B 7/14* (2006.01)
  *B29D 35/00* (2010.01)

(52) U.S. Cl.
  CPC .......... *A43B 23/0215* (2013.01); *A43B 23/07* (2013.01); *A43D 3/04* (2013.01); *B29D 35/0072* (2013.01); *B29D 35/126* (2013.01); *B29K 2075/00* (2013.01)

(56) References Cited

U.S. PATENT DOCUMENTS

| | | | | |
|---|---|---|---|---|
| 4,831,094 | A * | 5/1989 | Stein | B29C 61/003 264/230 |
| 5,057,252 | A * | 10/1991 | Kagawa | C08L 23/06 264/230 |
| 6,388,043 | B1 * | 5/2002 | Langer | B29C 61/003 525/415 |
| 6,558,784 | B1 | 5/2003 | Norton et al. | |
| 7,230,047 | B2 * | 6/2007 | Issari | C08J 5/00 524/500 |
| 7,422,714 | B1 * | 9/2008 | Hood | B29C 33/40 264/219 |
| 7,622,069 | B1 * | 11/2009 | Kia | B29C 33/485 264/230 |
| 7,992,243 | B2 | 8/2011 | Cook et al. | |
| 8,101,689 | B2 * | 1/2012 | Tong | B29C 61/003 525/107 |
| 8,109,536 | B2 | 2/2012 | Labonte | |
| 8,578,534 | B2 | 11/2013 | Langvin et al. | |
| 8,608,890 | B2 * | 12/2013 | Everhart | B29C 33/485 156/242 |
| 8,839,530 | B2 | 9/2014 | Smith et al. | |
| 8,961,723 | B2 * | 2/2015 | Langvin | A43B 3/0084 156/212 |
| 9,107,479 | B2 * | 8/2015 | Hanson | A43D 3/04 |
| 9,114,570 | B2 * | 8/2015 | Downs | A43B 23/0225 |
| 2002/0023306 | A1 * | 2/2002 | Sajedi | A43D 1/04 12/133 R |
| 2007/0151656 | A1 * | 7/2007 | Gager | B29C 63/025 156/212 |
| 2009/0072436 | A1 | 3/2009 | Dean | |
| 2009/0076772 | A1 * | 3/2009 | Hinshaw | A43B 7/1465 702/167 |
| 2010/0175276 | A1 | 7/2010 | Dojan et al. | |
| 2010/0326591 | A1 * | 12/2010 | Langvin | A43B 3/0084 156/235 |
| 2011/0000106 | A1 | 1/2011 | Baychar | |
| 2011/0088285 | A1 * | 4/2011 | Dojan | A43B 7/085 36/87 |
| 2011/0107621 | A1 | 5/2011 | Mordecai et al. | |
| 2012/0198730 | A1 * | 8/2012 | Burch | A43B 23/0245 36/30 R |
| 2013/0047471 | A1 | 2/2013 | Liang | |
| 2013/0232815 | A1 * | 9/2013 | Meythaler | A43B 23/0225 36/45 |
| 2014/0059886 | A1 | 3/2014 | Lyttle et al. | |
| 2014/0075688 | A1 * | 3/2014 | Langvin | A43B 3/0084 12/133 R |
| 2014/0134378 | A1 * | 5/2014 | Downs | A43B 23/0225 428/57 |
| 2014/0180866 | A1 * | 6/2014 | Gonzales | A43D 3/04 705/26.7 |
| 2014/0223671 | A1 | 8/2014 | Fisher et al. | |
| 2015/0013187 | A1 | 1/2015 | Taniguchi et al. | |
| 2015/0052778 | A1 * | 2/2015 | Kirk | A43B 1/0009 36/45 |
| 2016/0058105 | A1 | 3/2016 | Mordecai et al. | |
| 2016/0088895 | A1 | 3/2016 | Viniero et al. | |
| 2016/0185062 | A1 | 6/2016 | Boucher et al. | |
| 2016/0295971 | A1 | 10/2016 | Arnese et al. | |

FOREIGN PATENT DOCUMENTS

| | | |
|---|---|---|
| EP | 2 815 668 A1 | 12/2014 |
| KR | 10-0626160 B1 | 9/2006 |
| KR | 10-0903193 B1 | 6/2009 |
| WO | WO 2014/207325 A1 | 12/2014 |
| WO | 2017083550 A1 | 5/2017 |

* cited by examiner

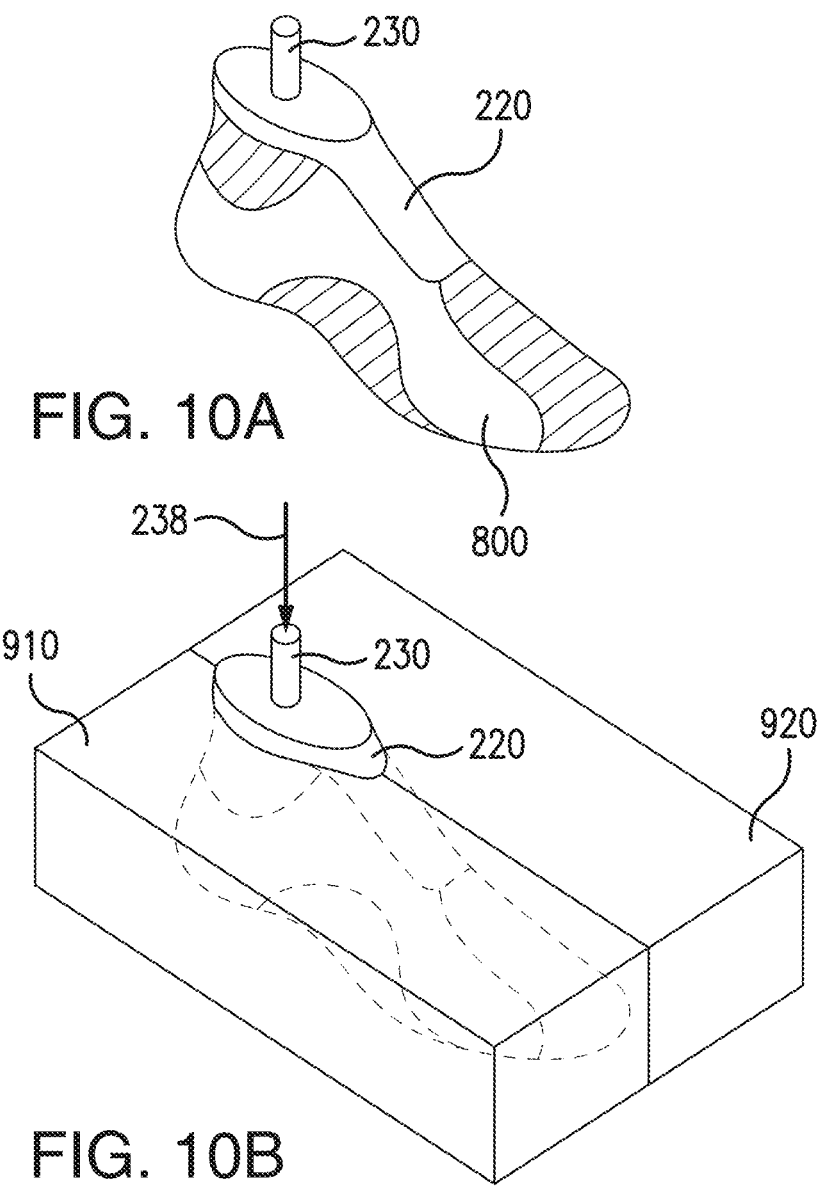
FIG. 10A
FIG. 10B
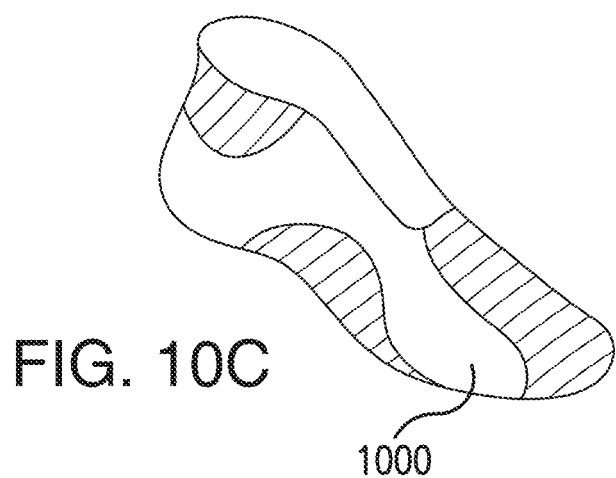
FIG. 10C

THREE-DIMENSIONAL THERMO-MOLDING OF FOOTWEAR

FIELD

The described embodiments generally relate to articles of footwear and methods of making articles of footwear. In particular, described embodiments relate to articles of footwear and methods of making articles of footwear with a three-dimensional thermo-molding process.

BACKGROUND

Individuals are often concerned with the durability, weight, and/or comfort of an article of footwear. This is true for articles of footwear worn for non-performance activities, such as a leisurely stroll, and for performance activities, such as running. Durable footwear will properly function for an extended period of time. Lightweight footwear minimizes the weight an individual has to carry on his or her feet and may be comfortable for an individual. Customized footwear may increase comfort for an individual because it is tailored to the individual's foot anatomy.

Proper footwear should be durable, comfortable, and provide other beneficial characteristics for an individual. Therefore, a continuing need exists for innovations in footwear and fabrics used to manufacture the footwear.

BRIEF SUMMARY OF THE INVENTION

Some embodiments are directed towards a method of manufacturing an upper for an article of footwear, the method including disposing an inflatable bladder around a last; disposing a skin over the inflatable bladder, the skin including at least one of: a base layer including a low melting point thermoplastic polymer and a grid layer including a yarn composed of a low melting point thermoplastic polymer; placing the assembled last, inflatable bladder, and skin within a cavity of a mold; heating the mold to a predetermined temperature; and inflating the inflatable bladder such that the skin is pressed against an interior surface of the heated mold cavity to cause the skin to take on the shape of the internal surface of the mold cavity onto which it is pressed, thereby forming an upper for an article of footwear.

Some embodiments are directed to an upper for an article of footwear made by disposing an inflatable bladder around a last; disposing a skin over the inflatable bladder, the skin including at least one of: a base layer including a low melting point thermoplastic polymer and a grid layer including a yarn composed of a low melting point thermoplastic polymer; placing the assembled last, inflatable bladder, and skin within a cavity of a mold; heating the mold to a predetermined temperature; and inflating the inflatable bladder such that the skin is pressed against an interior surface of the heated mold cavity to cause the skin to take on the shape of the internal surface of the mold cavity onto which it is pressed, thereby forming an upper for an article of footwear.

Some embodiments are directed to a method of manufacturing an upper for an article of footwear, the method including disposing an inflatable bladder around a last; disposing a skin over the inflatable bladder, the skin including a layer including a low melting point thermoplastic polymer; placing the assembled last, inflatable bladder, and skin within a cavity of a mold; heating the mold to a predetermined temperature less than or equal to 180 degrees C.; and inflating the inflatable bladder such that the skin is pressed against an interior surface of the heated mold cavity to cause the skin to take on the shape of the internal surface of the mold cavity onto which it is pressed, thereby forming an upper for an article of footwear.

Some embodiments are directed towards an upper for an article of footwear, the upper including a single integrally molded skin defining a forefoot portion, a midfoot portion, and a rearfoot portion of the upper, the skin including at least one of: a base layer defining a forefoot portion, a midfoot portion, and a rearfoot portion of the upper and including a low melting point thermoplastic polymer; and a grid layer including a yarn composed of a low melting point thermoplastic polymer.

Some embodiments are directed towards an article of footwear including a midsole coupled to an upper, the upper including a single integrally molded skin defining a forefoot portion, a midfoot portion, and a rearfoot portion of the upper, the skin including at least one of: a base layer defining a forefoot portion, a midfoot portion, and a rearfoot portion of the upper and including a low melting point thermoplastic polymer; and a grid layer including a yarn composed of a low melting point thermoplastic polymer.

Some embodiments are directed towards an upper for an article of footwear, the upper including a single integrally molded skin defining a forefoot portion, a midfoot portion, and a rearfoot portion of the upper, the skin including a yarn composed of a low melting point thermoplastic polymer.

BRIEF DESCRIPTION OF THE DRAWINGS/FIGURES

FIGS. 10A, 10B, and 10C are an exemplary process for three-dimensionally thermo-molding an upper according to an embodiment.

Figure 11A:
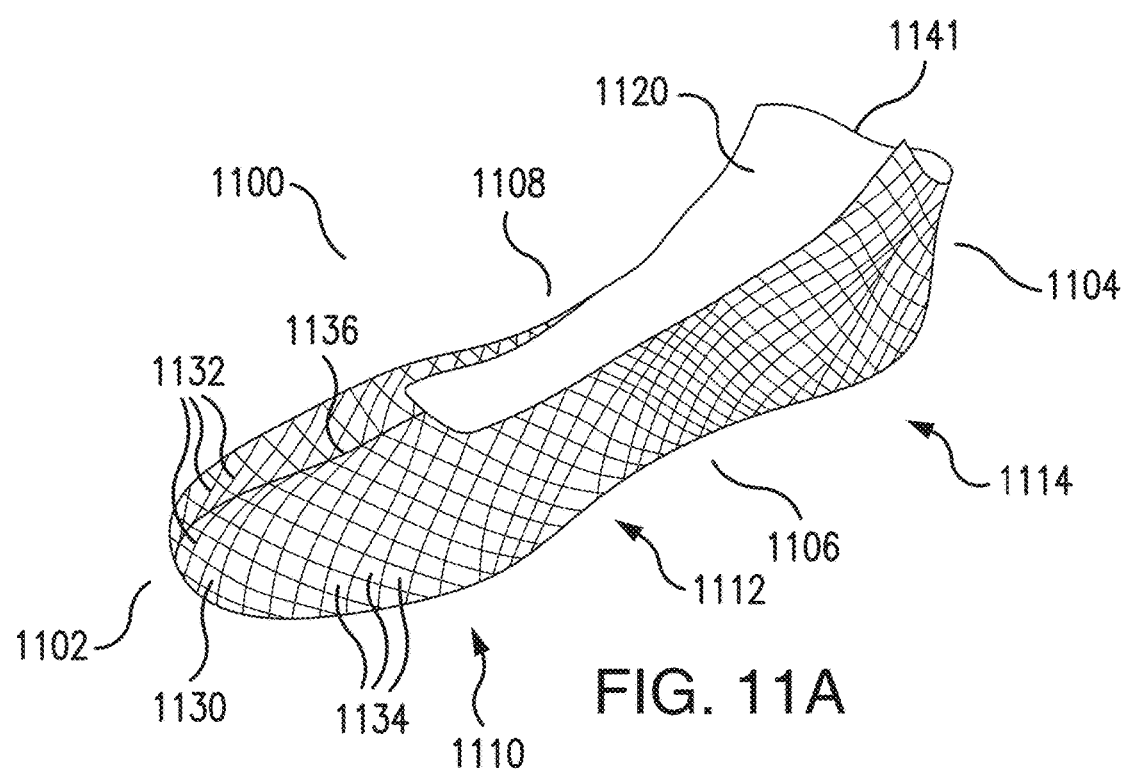
Figure 11B:
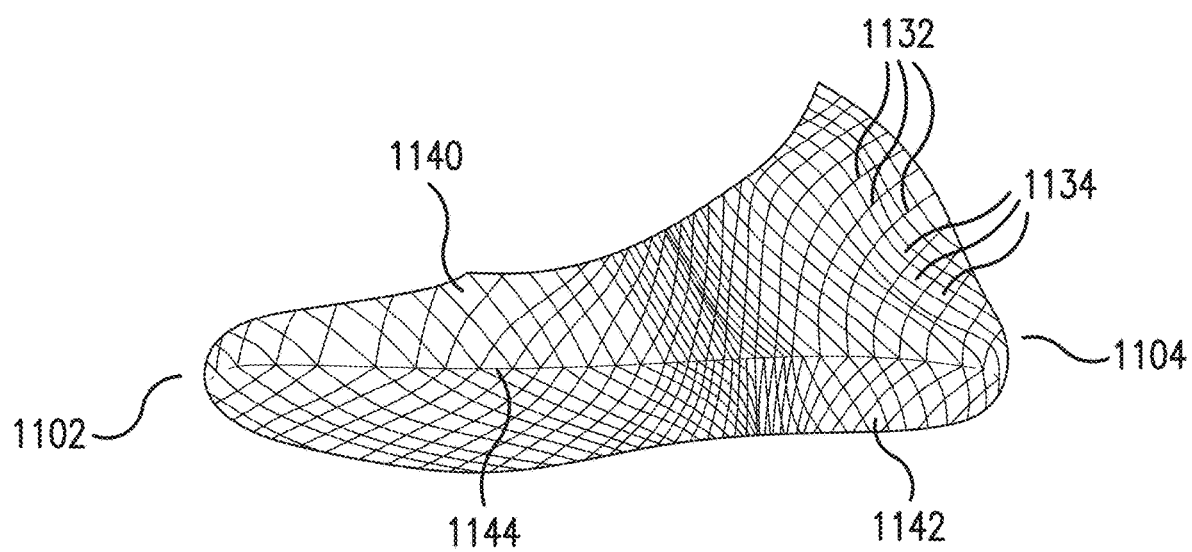

FIG. 11A is a top perspective view of an upper according to an embodiment. FIG. 11B is a bottom perspective view of an upper according to an embodiment.

Figure 12:
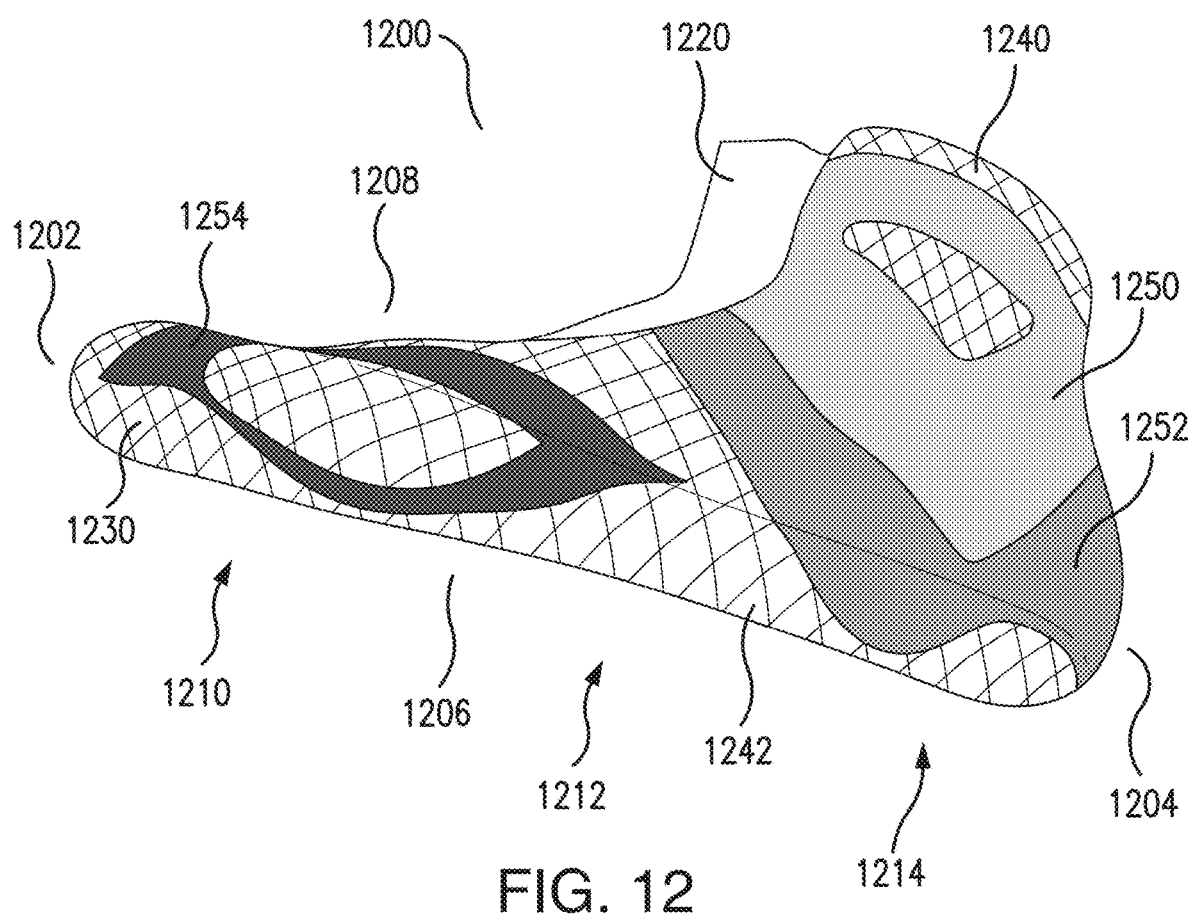

FIG. 12 is a bottom perspective view of an upper according to an embodiment.

Figure 13:
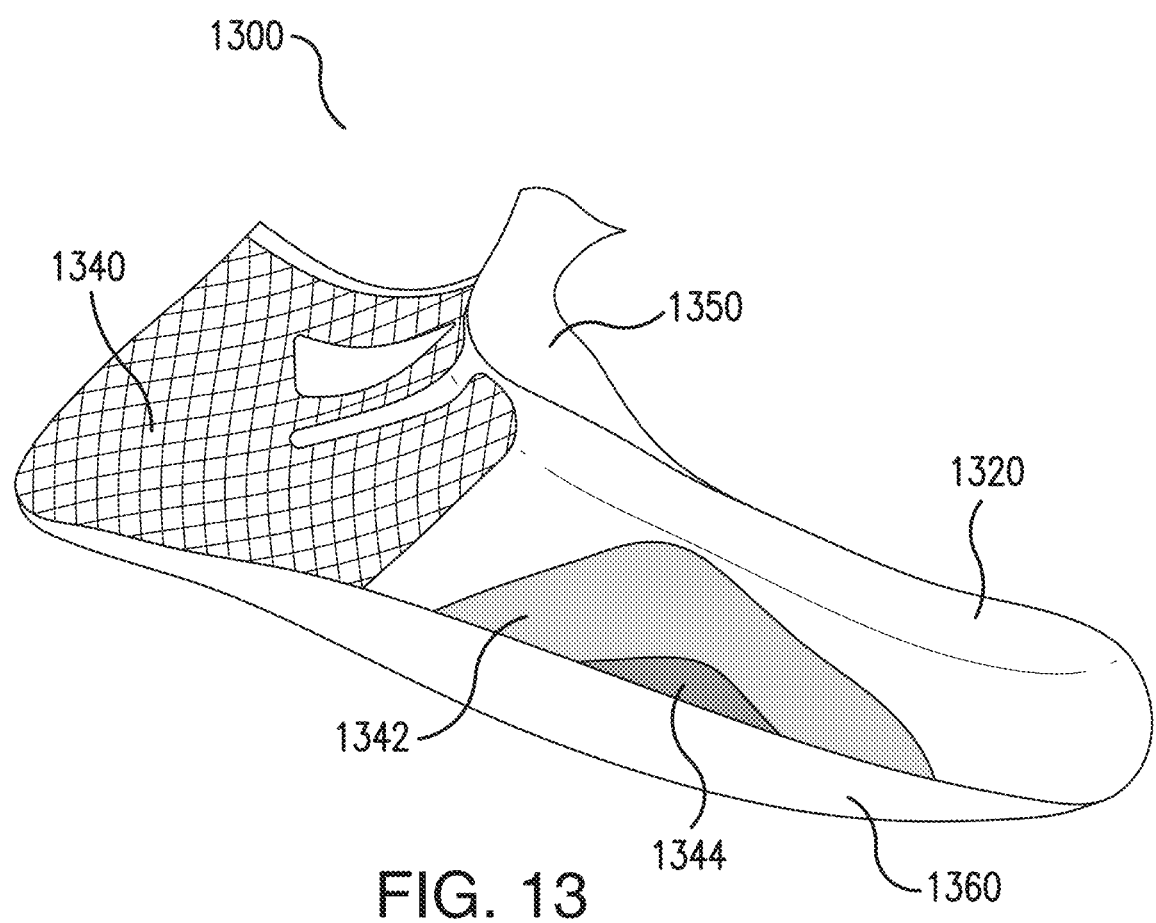

FIG. 13 is a side view of an upper according to an embodiment.

Figure 14:
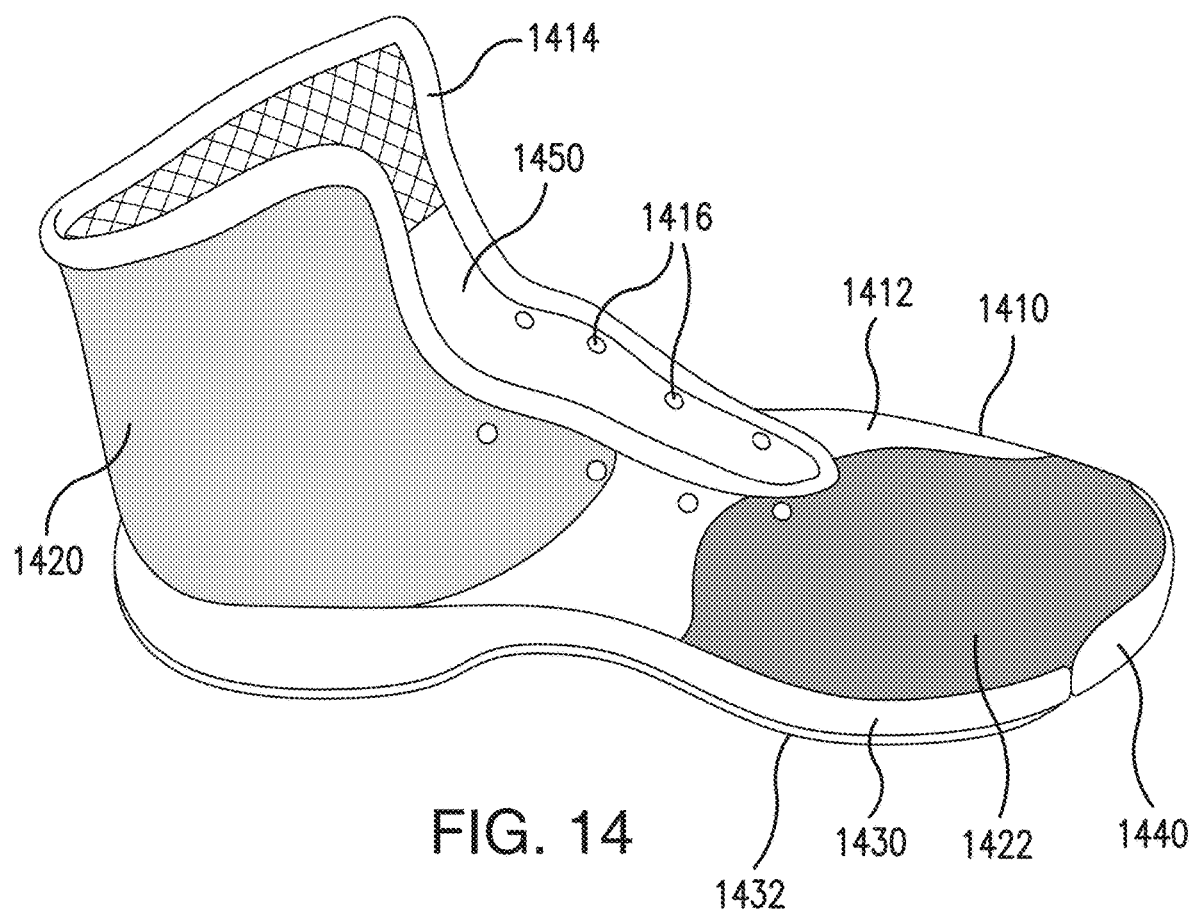

FIG. 14 is a perspective view of an article of footwear according to an embodiment.

Figure 15:
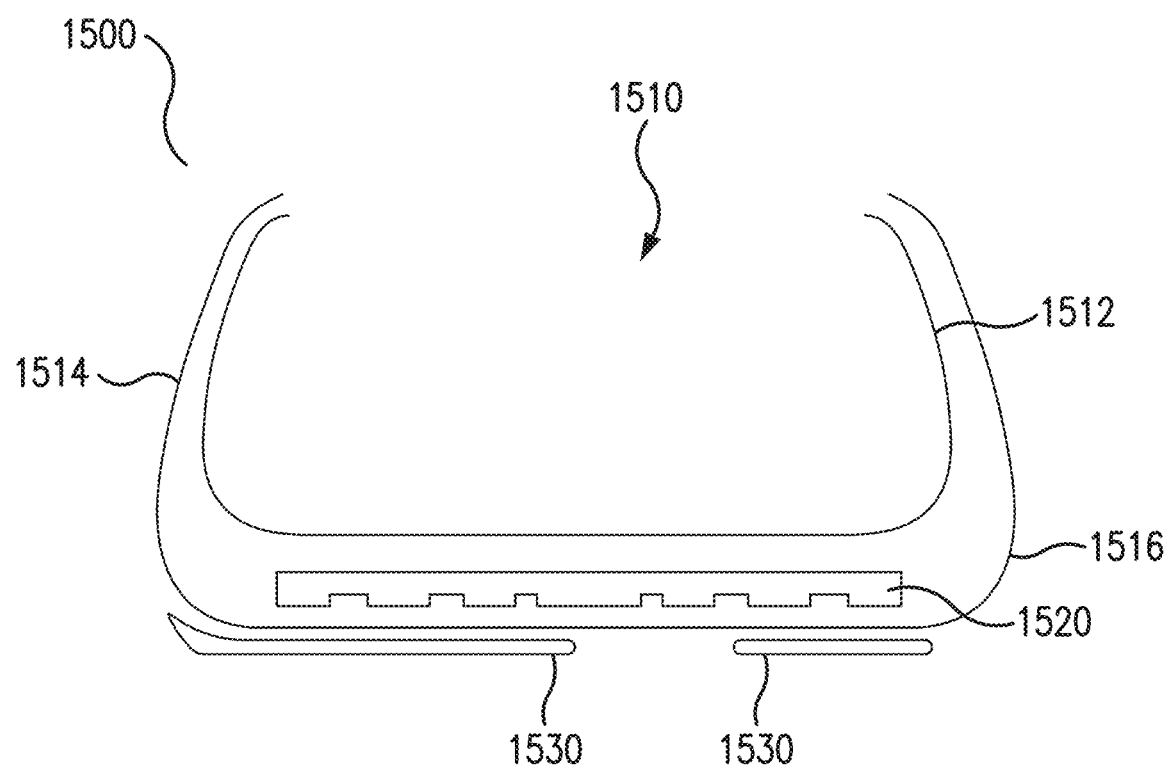

FIG. 15 is an exploded cross-sectional view of an article of footwear according to an embodiment.

DETAILED DESCRIPTION OF THE INVENTION

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

An article of footwear has many purposes. Among other things, an article of footwear may serve to provide cushioning for a wearer's foot, support a wearer's foot, and protect a wearer's foot. Each of these purposes, alone or in combination, provides for a comfortable article of footwear suitable for use in a variety of scenarios (e.g., exercise and every day activities). The features of an article of footwear (e.g., shape and materials used to make footwear) may be altered to produce desired characteristics, for example, durability, support, weight, and/or breathability.

Durable footwear will properly function for an extended period of time and may instill a wearer's trust in specific manufacture's footwear, leading to repeat sales. Supportive footwear may protect an individual's feet from injury. For example, an article of footwear configured to provide ankle support may be prevent injury to an individual's ankle by inhibiting undue twisting of the ankle. Lightweight footwear may be conformable for an individual, and for individuals competing in an athletic activity, such as running or biking, may provide a completive edge due to the decreased weight the individual carries on his or her feet. Breathable footwear may increase comfort for an individual by wicking sweat and heat away from an individual's foot. Designing footwear having a high degree of one or more of these characteristics without detrimentally affecting other characteristics of the footwear may be desirable.

An article of footwear, or a portion thereof (e.g., an upper), may be configured to provide various degrees of durability, support, weight, breathability, etc. But the cost of manufacturing the article of footwear may also be a consideration. Footwear, or a portion thereof, that may be manufactured at a relatively low cost may be desirable for manufactures and consumers. Footwear that can be manufactured using a relatively small amount of resources (e.g., energy and man power), materials, and time reduces manufacturing costs and may also reduce the environmental impact of manufacturing.

Further, a manufacturing process that facilities the manufacture of customized footwear without increasing the complexity of the manufacturing process may be desirable. Customizing an article of footwear, or a portion thereof (e.g., an upper), for a particular individual or a group of individuals having similar foot anatomies (e.g., foot size and shape) may provide proper support and increased comfort for an individual. Also, it may allow an individual to order/buy articles of footwear customized to his or her needs. Moreover, it may allow the individual to order/buy new and/or replacement articles of footwear customized to his or her needs when desired.

In some embodiments, the article of footwear discussed herein may include an upper manufactured using a three-dimensional thermo-molding process. In some embodiments, the upper may be composed of one or more low melting point thermoplastic polymers. In some embodiments, the upper may be composed of a plurality of layers, each layer composed of one or more low melting point thermoplastic polymers.

In some embodiments, the maximum processing temperature of the three-dimensional thermo-molding processes discussed herein may be less than the melting point of the low melting point thermoplastic polymers used to form the upper. In some embodiments, the maximum processing temperature of the three-dimensional thermo-molding process may be such that the process releases little to no volatile substances (e.g., vapors created by chemical reactions such as those created during curing of a polymer). In some embodiments, the thermo-molding process may not cause a change in the chemical composition of the low melting point thermoplastic polymers used to form the upper. The use of low processing temperatures may reduce manufacturing cost and may reduce environmental impact of a manufacturing process by reducing the release of volatile substances. Further, a manufacturing process that does not rely on the occurrence of chemical reactions may result in a manufacturing process that is easier to control and reproduce. In some embodiments, the processing temperature of the three-dimensional thermo-molding process may be such that the low melting point thermoplastic polymer of a layer of the upper (e.g., the base layer) is malleable but does not fuse to the material of another layer of the upper (e.g., the yarns of a grid layer).

In some embodiments, the maximum processing temperature of the three-dimensional thermo-molding processes discussed herein may be greater than the softening point temperature of the low melting point thermoplastic polymers used to form the upper. The softening point temperature of a polymer may be measured using a Vicat softening point test. The use of such a temperature may allow different polymers and/or layers of polymers to bond (e.g., fuse) together during thermo-molding. Further, it may allow the different polymers and/or layers of polymers to take on the shape of a mold cavity used to form an upper.

In some embodiments, the maximum processing temperature of the three-dimensional thermo-molding processes discussed herein may be 180 degrees C. or less. In some embodiments, the maximum processing temperature of the three-dimensional thermo-molding processes discussed herein may be in the range of 180 degrees C. to 80 degrees C. In some embodiments, the maximum processing temperature of the three-dimensional thermo-molding processes discussed herein may be 160 degrees C. or less. In some embodiments, the maximum processing temperature of the three-dimensional thermo-molding processes discussed herein may be in the range of 160 degrees C. to 65 degrees C.

Figure 1:
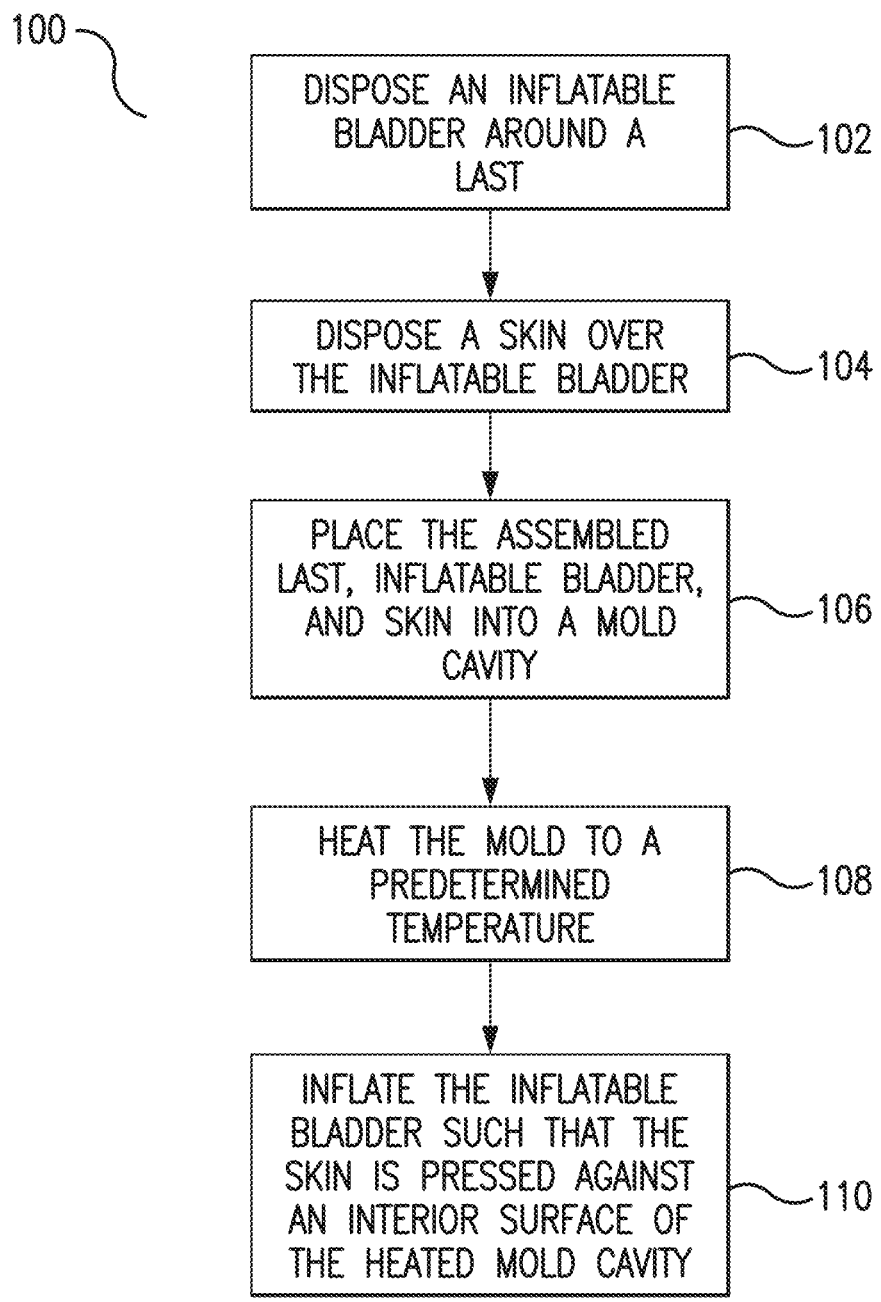
FIG. 1 is an exemplary flowchart of a method according to an embodiment.

FIG. 1 shows an exemplary flowchart of a method of thermo-forming an upper for an article of footwear according to an embodiment. In step 102, an inflatable bladder (e.g., inflatable bladder 220) may be disposed around a last (e.g., last 210) having a shape similar to that of a human foot (see e.g., FIGS. 2 and 3). The inflatable bladder may be made of a deformable material such as, but not limited to, rubber, silicone, and silicone room temperature vulcanization (RTV silicone). In some embodiments, the inflatable bladder may be made of an elastomeric material.

Figure 8A:
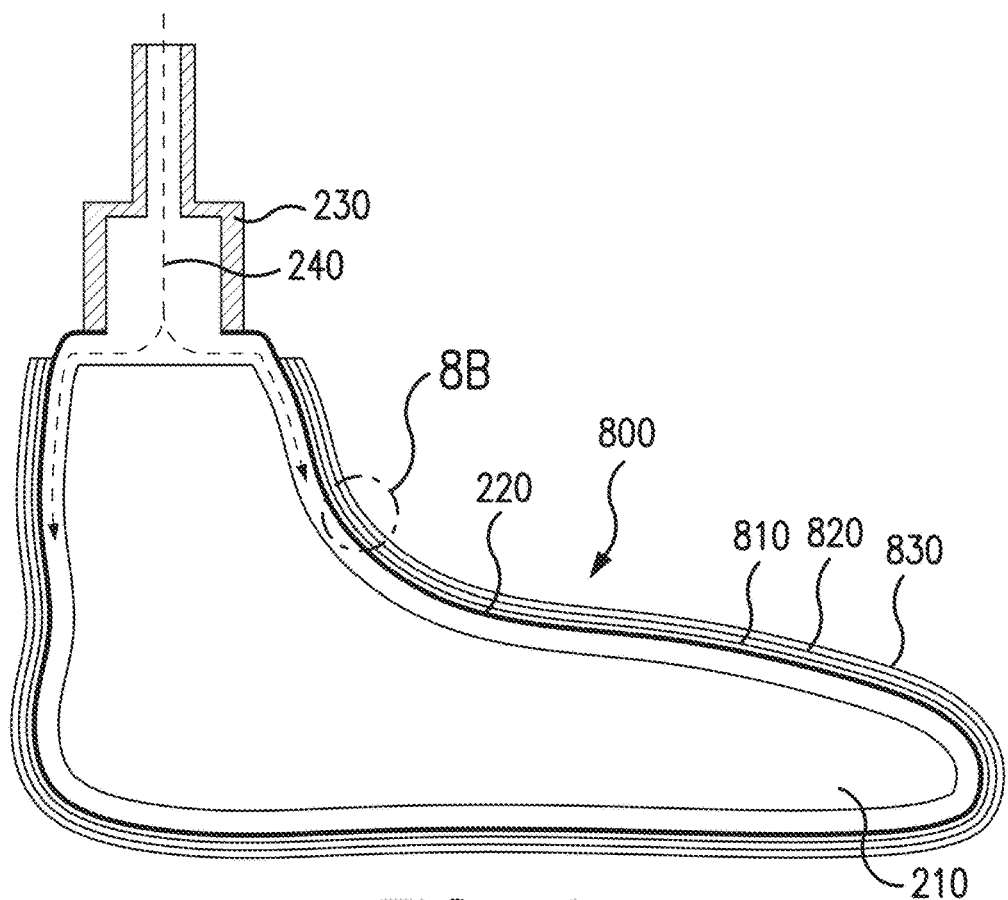
FIG. 8A is a cross-sectional view of various layers of a skin disposed over an inflatable bladder assembly according to an embodiment.

After disposing an inflatable bladder around a last in step 102, a skin (e.g., skin 800) may be disposed over the inflatable bladder, thereby forming an assembled last, inflatable bladder, and skin in step 104 (see e.g., FIG. 8A). The skin may define at least a portion of an upper for an article footwear after thermo-forming. In some embodiments, the skin may include one or more layers, where at least one of the layers includes a low melting point thermoplastic polymer. In some embodiments, each layer of the skin may include a low melting point thermoplastic polymer. For example, in some embodiments, the skin may include a base layer composed of one or more low melting point thermoplastic polymers and a grid layer including a yarn composed of one or more a low melting point thermoplastic polymers. In some embodiments, the skin may include layers composed of only low melting point thermoplastic polymers.

As used herein, "disposed over" means that a second layer/material is deposited, formed, or placed over a first layer/material. The contact between the second layer/material and the first layer/material may be indirect (i.e., there may be other layers between the first and second layers/materials), unless it is specified that the first layer/material is "in contact with," "deposited on," or the like with respect to the second layer/material. For example, a second layer/material may be described as "disposed over" a first layer/material, even though there are various layers/materials in between the first layer/material and the second layer/material. Furthermore, if a second layer/material is "disposed over" a first layer/material, the second layer/material is formed, deposited, or placed after the first layer/material (i.e., the first layer/material is present before the second layer/material is disposed over it).

As used herein, "low melting point thermoplastic polymer" means a thermoplastic polymer having a melting point of 200 degrees C. or less. Suitable low melting point thermoplastic polymers include, but are not limited to, low melting point polyesters, polyamides, polyethylene (PE), PE foams, polyurethane (PU) foams, and co-polymers or polymer blends including one or more these polymers.

As used herein, "high melting point thermoplastic polymer" means a thermoplastic polymer having a melting point of more than 200 degrees C. Suitable high melting point thermoplastic polymers include, but are not limited to, thermoplastic polyurethane (TPU), polyurethane foams, silicone, and nylon. In some embodiments, one or more layers of an upper may include a high melting point thermoplastic polymer. In some embodiments, the inclusion of a high melting point thermoplastic polymer may provide variable heating and/or partial forming of an upper. Variable heating and/or partial forming of different areas of an upper may provide different characteristics (e.g., breathability and/or thermal conductivity) to different areas of the upper.

Figure 9:
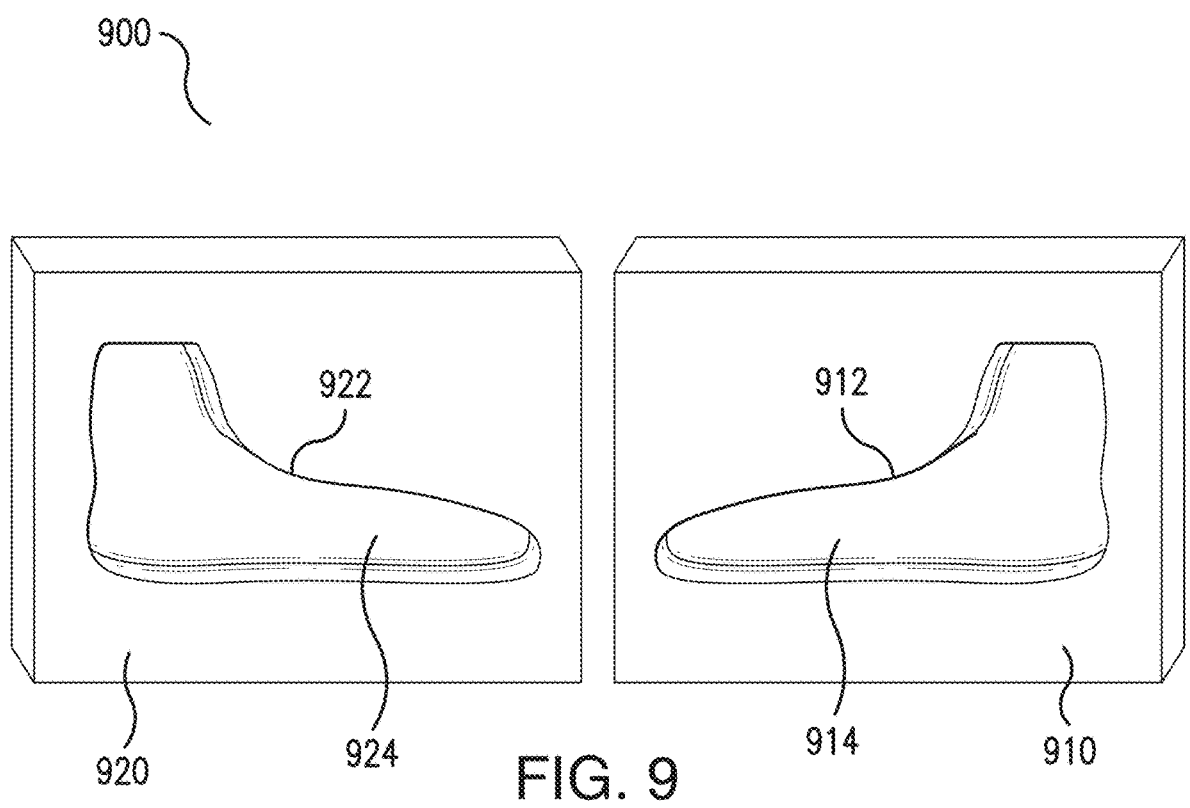
FIG. 9 is mold according to an embodiment.

In step 106, the assembled last, inflatable bladder, and skin may be placed within a cavity of a mold (e.g., mold 900 in FIG. 9). The cavity of the mold may include an interior shape corresponding to a desired shape for an upper. In step 108, the mold may be heated to a predetermined temperature. In step 110, the inflatable bladder may be inflated such that the skin is pressed against the interior surface of the heated mold cavity to cause the skin to take on the shape of the internal surface of the mold cavity onto which it is pressed, thereby forming an upper for an article of footwear. In this manner, the layers of the skin may be molded together, thereby forming a single integrally molded skin defining a forefoot portion, a midfoot portion, and a rearfoot portion of an upper. The skin may have a general shape corresponding to the shape of a human foot before it is pressed against the interior surface of the mold. After it is pressed against the interior surface of the mold, the skin may have a shape corresponding to an upper for a particular size of footwear (e.g., a particular length and width (size) and type of footwear (e.g., basketball shoe or football cleat)). After the skin takes on the shape of an upper, the upper may be removed from the mold and any excess material, if present, may be removed (e.g., by a cutting process).

Figure 2:
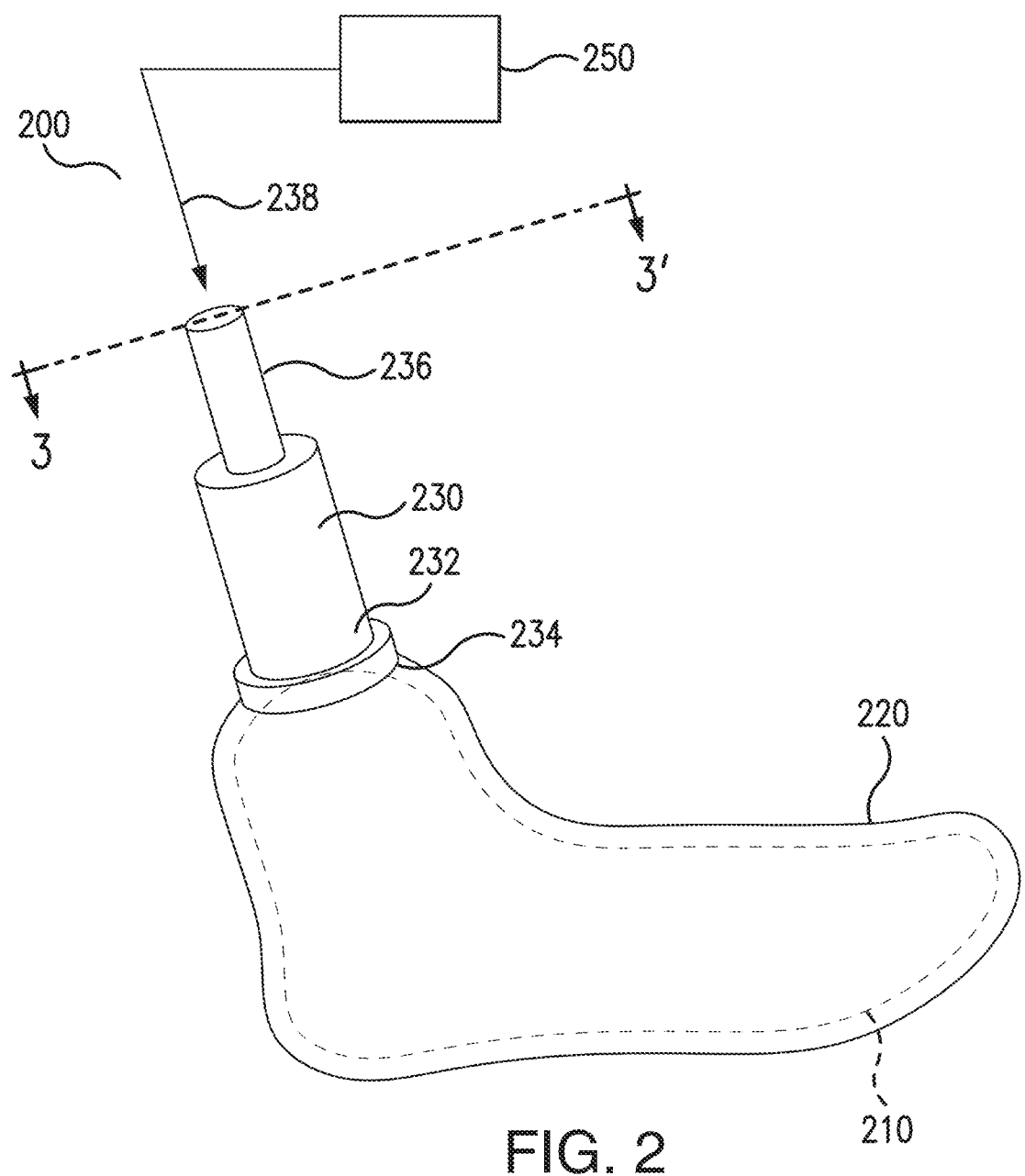
FIG. 2 is a perspective view of an inflatable bladder assembly according to an embodiment.
Figure 3:
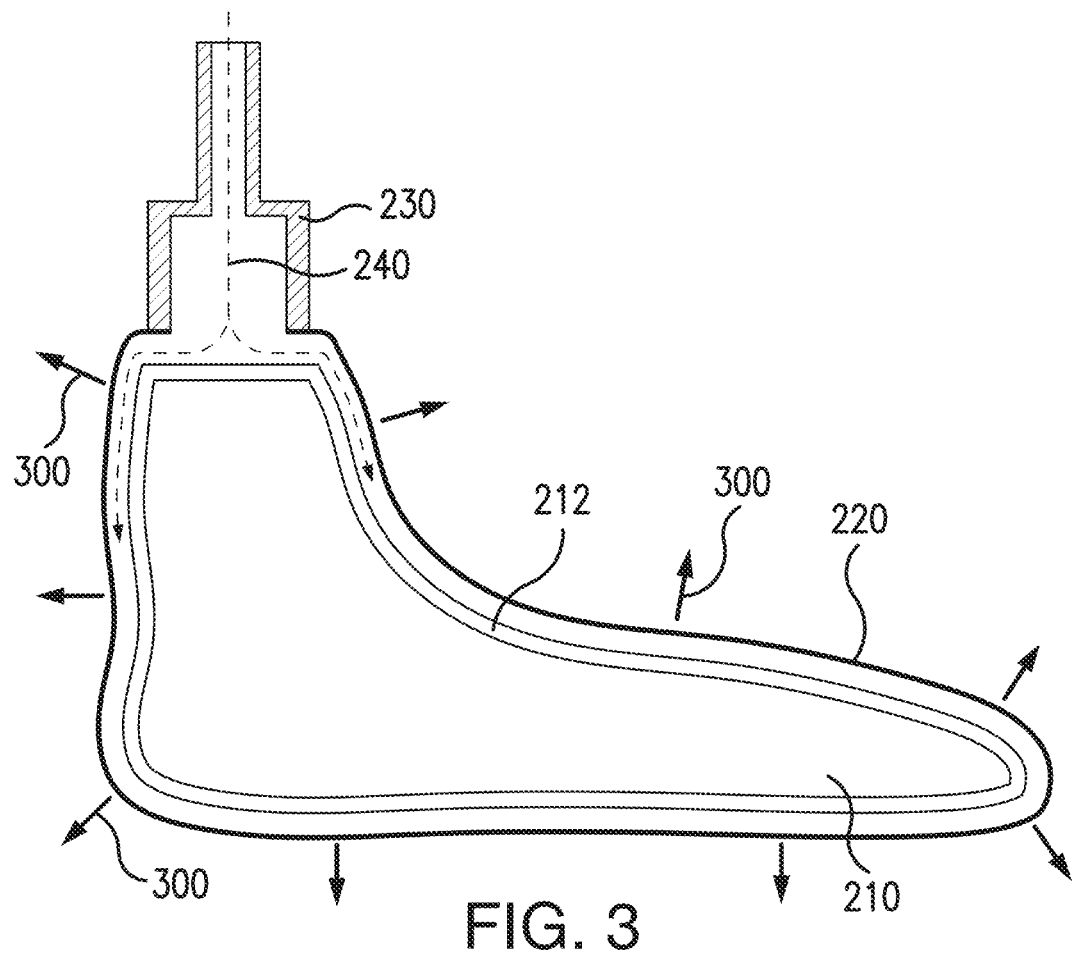
FIG. 3 is a cross-sectional view along the line 3-3' in FIG. 2.

FIGS. 2 and 3 show an inflatable bladder assembly 200 according to an embodiment. In some embodiments, inflatable bladder assembly 200 may include an inflatable bladder 220 disposed around a last 210 (last 210 is shown in broken lines in FIG. 2 for illustration purposes). In some embodiments, inflatable bladder 220 may be disposed around last 210 and in direct contact with last 210. In some embodiments, a release liner 212 may be disposed between last 210 and inflatable bladder 220. In such embodiments, release liner 212 may facilitate air flow between last 210 and inflatable bladder 220 by preventing adhesion between last 210 and inflatable bladder 220. Release liner 212 may be, but is not limited to, a Teflon® layer/film or a textured paper layer/film. In some embodiments, inflatable bladder 220 may have a hollow shape similar to the exterior shape of last 210 (e.g., a hollow shape corresponding to the shape of a human foot).

In some embodiments, inflatable bladder assembly 200 may include a connector 230. Connector 230 may include a first end 232 coupled to inflatable bladder 220 via a coupling 234 and a second end 236 configured to couple with a pressure conduit for delivering pressurized air 238 from a pressure source 250. Coupling 234 may create an air tight seal between first end 232 of connector 230 and inflatable bladder 220. In some embodiments, coupling 234 may be a hose clamp. In some embodiments, inflatable bladder 220 may include a coupling configured to engage coupling 234. For example, inflatable bladder 220 may include a male/female coupling and coupling 234 may include the corresponding female/male coupling. In some embodiments, connector 230 may include a pressure valve for regulating the pressure of pressurized air 238 pumped into inflatable bladder 220.

As shown in FIG. 3, pressurized air 238 delivered via connector 230 may flow between inflatable bladder 220 and last 210 (see e.g., air flow 240). Pressurized air pumped between inflatable bladder 220 and last 210 will cause inflatable bladder 220 to expand outward from inflatable last 210 (i.e. in the direction of arrows 300 in FIG. 3). In some embodiments, inflatable bladder 220 may expand symmetrically outward from last 210. In such embodiments, inflatable bladder 220 may maintain a hollow shape corresponding to the shape of a human foot as it expands outward. As inflatable bladder 220 expands outward, it may force a skin and its layers (e.g., base layer, grid layer(s), and shell layer(s)) disposed over it outward as well.

Figure 4A:
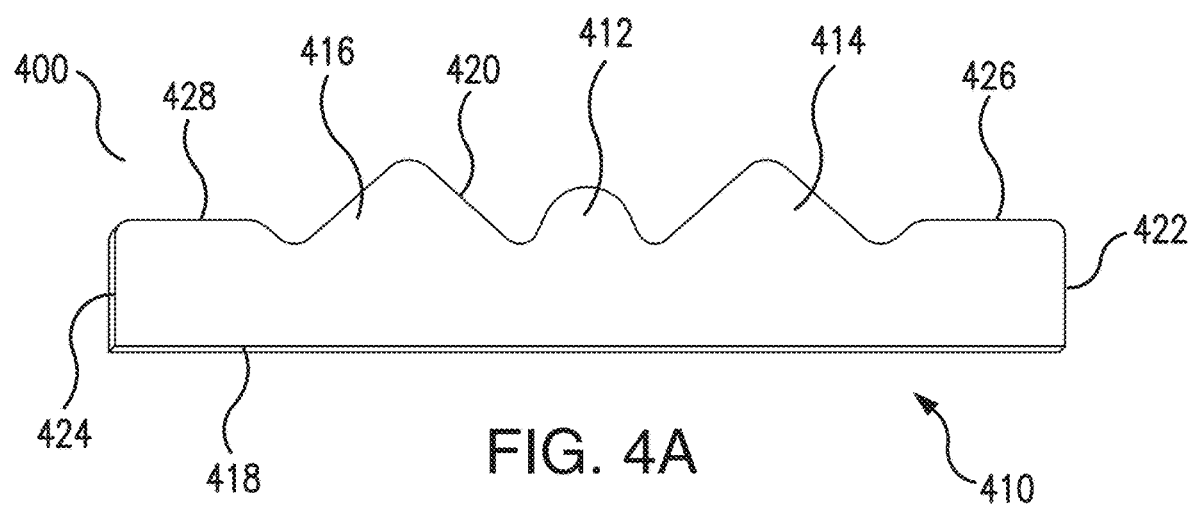
FIGS. 4A and 4B show a multi-piece base layer according to an embodiment.
Figure 4B:
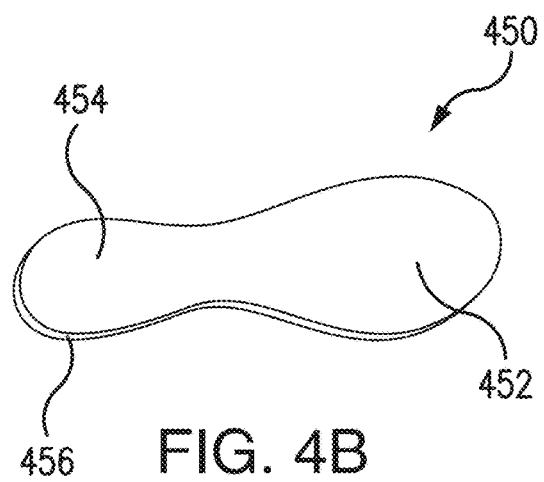

FIGS. 4A and 4B show a base layer 400 for a skin according to an embodiment. Base layer 400 may be configured (i.e., sized and shaped) to define at least a portion of a forefoot portion, midfoot portion, and rearfoot portion of an upper. Base layer 400 may include a peripheral section 410 and a bottom section 450. Peripheral section 410 may be sized and shaped to form the medial portion, lateral portion, and heel portion of base layer 400. Bottom section 450 may be sized and shaped to form the bottom portion of base layer

400. Peripheral section 410 and bottom section 450 may be composed of one or more low melting point thermoplastic polymers.

In some embodiments, peripheral section 410 may be a single integrally formed piece of material. In some embodiments, bottom section 450 may be a single integrally formed piece of material. In some embodiments, the integrally formed piece(s) of material may be cut from a source material by a single cutting operation (e.g., a single die cutting or laser cutting operation). In some embodiments, the source material may be a sheet or roll of material. Single integrally formed pieces of material that are cut by a single cutting operation may facilitate efficient and reproducible manufacturing of uppers for footwear. Moreover, such manufacturing may reduce waste by reducing waste material created during manufacturing. In some embodiments, peripheral section 410 and bottom section 450 may be coupled together to form a three-dimensional shape corresponding to the shape of a human foot before or after being disposed over an inflatable bladder (e.g., inflatable bladder 220).

In some embodiments, peripheral section 410 and bottom section 450 may be composed of the same material. In some embodiments, peripheral section 410 and bottom section 450 may be cut from the same source material. In some embodiments, peripheral section 410 and bottom section 450 may be composed of different materials. In some embodiments, the material of peripheral section 410 and/or bottom section 450 of base layer 400 may be a mechanically isotropic material. In some embodiments, the material of peripheral section 410 and/or bottom section 450 of base layer 400 may be a homogenous material.

When coupled together, peripheral section 410 and bottom section 450 may form a substantially mechanically isotropic base layer 400. When coupled together, peripheral section 410 and bottom section 450 may form a substantially homogenous material layer, with the exception of the location of any seams on base layer 400 (e.g., the seam joining peripheral section 410 and bottom section 450). The homogenous and/or mechanically isotropic nature of base layer 400 may facilitate uniform outward expansion of base layer 400 when acted on by an inflatable bladder over which base layer 400 is disposed. This may serve to create a substantially uniform wall thickness of base layer 400 after it is expanded by an inflatable bladder. This may also serve to ensure proper positioning of layers disposed over base layer 400.

Peripheral section 410 may include a heel portion 412 for defining the portion of base layer 400 that wraps around the heel of a wearer, a medial portion 414 for defining the medial side of base layer 400, and a lateral portion 416 for defining the lateral side of base layer 400. A top edge 420 of peripheral section 410 may define at least portion of an opening in base layer 400 through which a wearer inserts his or her foot when putting on an article of footwear including base layer 400. Top edge 420 may include a medial toe edge 422 and a lateral toe edge 424, which may be coupled together to define a toe end of base layer 400 when peripheral section 410 is folded into a three-dimensional shape corresponding to the shape of a human foot. Top edge 420 may also include a medial forefoot edge 426 and a lateral forefoot edge 428, which may be coupled together to define a forefoot portion of base layer 400 when peripheral section 410 is folded into a three-dimensional shape corresponding to the shape of a human foot. Edges of peripheral section 410 may be coupled together using, for example, stitching and/or an adhesive. In some embodiments, peripheral section 410 may include an extension on top edge 420 configured to define the tongue of an upper.

A bottom edge 418 of peripheral section 410 may be coupled to bottom section 450. For example, in some embodiments, bottom edge 418 may be stitched to bottom section 450 at a peripheral edge 456 of bottom section 450. In some embodiments, bottom edge 418 may alternatively or additionally be adhered to peripheral edge 456 via an adhesive. Bottom section 450 may include a forefoot portion 452 defining a forefoot area of bottom section 450 and a rearfoot portion 454 defining a rearfoot area of bottom section 450.

While FIGS. 4A and 4B show a base layer 400 sectioned into two pieces, base layer 400 may be sectioned into a different number of pieces that may be coupled together to form a three-dimensional shape corresponding to the shape of a human foot. As a non-limiting example, peripheral section 410 may be replaced with two sections, one defining the medial half of base layer 400 and one defining the lateral half of base layer 400.

Figure 5:
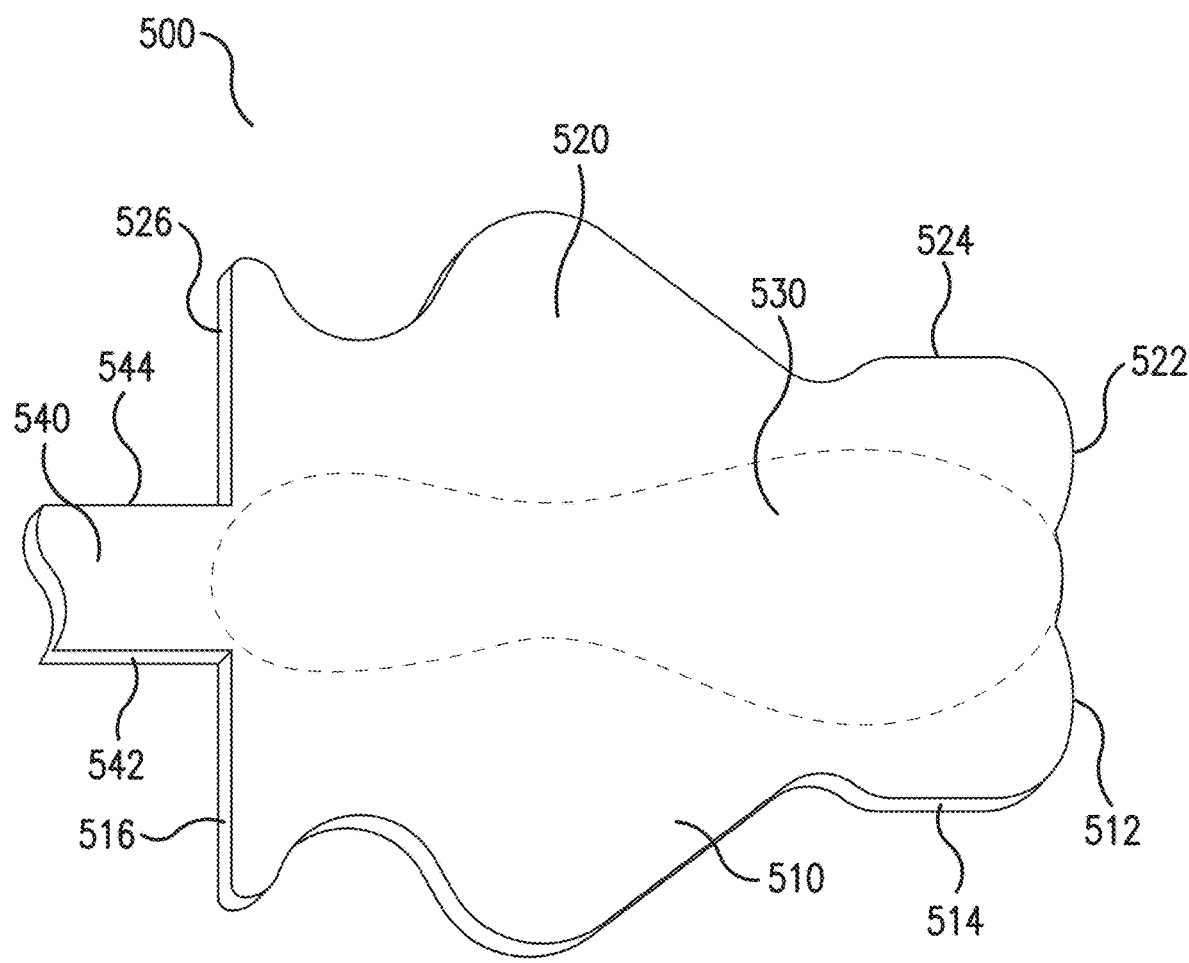
FIG. 5 is a single piece base layer according to an embodiment.

FIG. 5 shows a base layer 500 for a skin according to an embodiment. Base layer 500 may be configured (i.e., sized and shaped) to define at least a portion of a forefoot portion, midfoot portion, and rearfoot portion of an upper. Base layer 500 may include a single piece of material sized and shaped to define the medial portion 510, lateral portion 520, bottom portion 530 (shown in broken lines in FIG. 5 for illustration purposes), and heel portion 540 of base layer 500. Base layer 500 may be composed of one or more low melting point thermoplastic polymers In some embodiments, base layer 500 may be single integrally formed piece of material. In some embodiments, base layer 500 may be cut from a source material by a single cutting operation (e.g., a single die cutting or laser cutting operation). In some embodiments, the source material may be a sheet or roll of material. In some embodiments, the material of base layer 500 may be a mechanically isotropic material. In some embodiments, the material of base layer 500 may be a homogenous material.

Edges of base layer 500 may be coupled together to form a three-dimensional shape corresponding to the shape of a human foot before or after being disposed over an inflatable bladder (e.g., inflatable bladder 220). When folded into a shape corresponding to the shape of a human foot, base layer 500 may form a substantially mechanically isotropic material layer. When folded into a shape corresponding to the shape of a human foot, base layer 500 may form a substantially homogenous material layer, with the exception of the location of any seams on base layer 500 (e.g., the seams joining edges of base layer 500). The homogenous and/or mechanically isotropic nature of base layer 500 may facilitate uniform outward expansion of base layer 500 when acted on by an inflatable bladder over which base layer 500 is disposed.

Medial portion 510 of base layer 500 may include a toe edge 512 and lateral portion 520 may include a top edge 522, which may be coupled together to define a toe end of base layer 500 when base layer 500 is folded into a three-dimensional shape corresponding to the shape of a human foot. Similarly, medial portion 510 may include forefoot edge 514 and lateral portion 520 may include a forefoot edge 524, which may be coupled together to define a forefoot portion of base layer 500 when base layer 500 is folded into a three-dimensional shape corresponding to the shape of a human foot.

Medial portion 510 of base layer 500 may include a rearfoot edge 516 that may couple with heel portion 540 when base layer 500 is folded into a three-dimensional shape corresponding to the shape of a human foot. In particular, rearfoot edge 516 may couple with a medial heel edge 542 of heel portion 540. Similarly, lateral portion 520 may include a rearfoot edge 526 that may couple with heel portion 540 when base layer 500 is folded into a three-dimensional shape corresponding to the shape of a human foot. In particular, rearfoot edge 526 may couple with a lateral heel edge 544 of heel portion 540. Edges of base layer 500 may be coupled together using, for example, stitching and/or an adhesive.

While FIG. 5 shows base layer 500 cut so that particular edges are coupled together when folding base layer 500 into a three-dimensional shape corresponding to the shape of a human foot, base layer 500 may be cut in alternative ways. In other words, base layer 500 may be cut so that seams joining the edges of base layer 500 are positioned differently when base layer 500 is folded into a three-dimensional shape corresponding to the shape of a human foot.

In some embodiments, rather than including flat pieces(s) of material that are folded into a three-dimensional shape, the base layer for a skin may be three-dimensional piece of material. For example, the base layer may be an injection molded three-dimensional layer having a shape corresponding to the shape of a human foot. In such embodiments, the base layer may not include any seams.

Figure 6A:
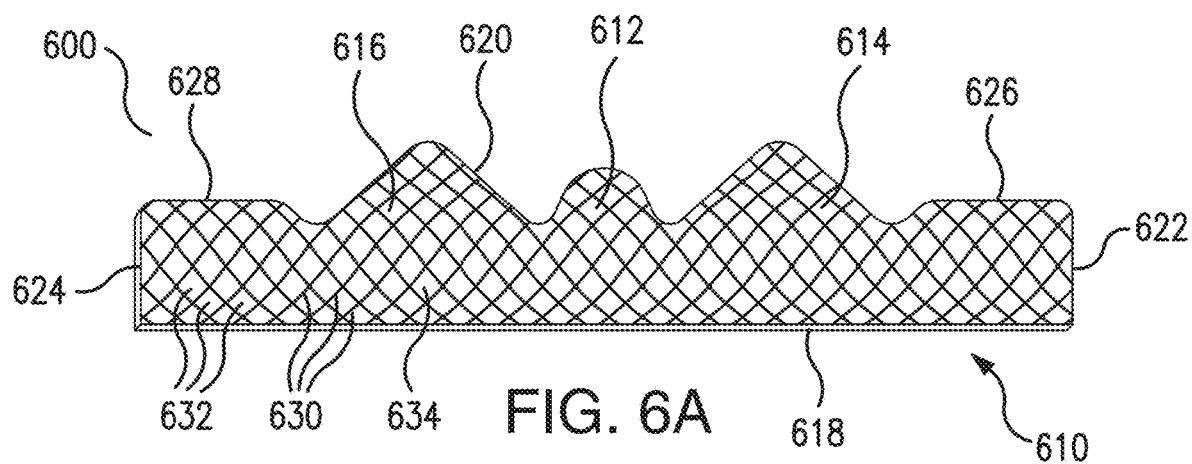
FIGS. 6A and 6B show a multi-piece grid layer according to an embodiment.
Figure 6B:
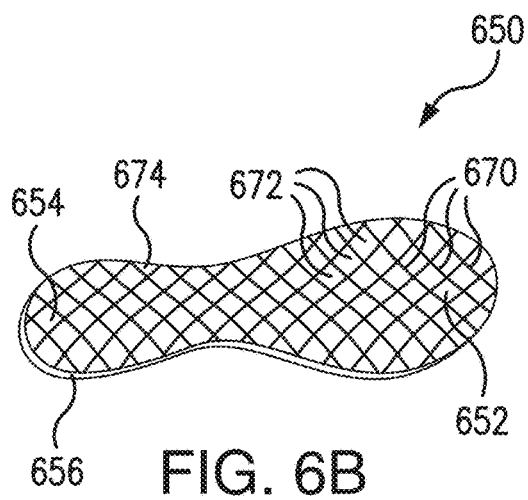

FIGS. 6A and 6B show a grid layer 600 for a skin according to an embodiment. Grid layer 600 may be composed of one or more low-melting point thermoplastic polymers. Grid layer 600 may include open pores defined by a lattice structure. In some embodiments, the lattice structure may be a porous layer composed of a low-melting point thermoplastic polymer. In some embodiments, the lattice structure may be a woven or non-woven structure defined by yarn. In some embodiments, grid layer 600 may include yarn composed of a low melting point thermoplastic polymer. In some embodiments, the yarn of grid layer 600 may be a low melting point thermoplastic polymer yarn. In some embodiments, the yarn of grid layer 600 may include thermoplastic polyurethane. In some embodiments, the yarn of grid layer 600 may include a polymeric fiber core (e.g., thermoplastic polyurethane fiber) coated with a low melting point thermoplastic polymer (e.g., a low melting point polyester or polyamide). In some embodiments, the yarn of grid layer 600 may be woven to form a woven grid layer 600.

In some embodiments, grid layer 600 may be an anisotropic layer configured to provide one or more different characteristics to different areas of upper. In some embodiments, grid layer 600 may be a mechanically anisotropic layer. Grid layer 600 may include an open pore pattern including areas having different porosities (i.e., open pore densities) configured to provide one or more different characteristics to different areas of an upper. In embodiments including a grid layer 600 including yarn, grid layer 600 may include an open pore pattern including areas having different porosities (i.e., open pore densities) defined by the arrangement of the yarn (e.g., the weave pattern of the yarn). In some embodiments, grid layer 600 may include a pattern including areas with different yarn densities configured to provide one or more different characteristics to different areas of the upper.

Grid layer 600 may include open pores arranged in a specific pattern (or composition of different patterns) to provide desired characteristics, such as but not limited to, ventilation, breathability, thermal conductivity, stretchability, and strength for an upper. In some embodiments, the pattern may be non-uniform to provide varying degrees of one or more of these characteristics to a particular area or areas of an upper. In some embodiments, grid layer 600 may provide at least one of: targeted zonal strength, targeted thermal conductivity, targeted breathability, and desired stretchability. In some embodiments, the pattern of grid layer 600 may work in concert with other layers of a skin (e.g., a base layer or shell layer(s)) to provide desired characteristics.

In some embodiments, grid layer 600 may include a peripheral section 610 sized and shaped to form the medial portion, lateral portion, and heel portion of grid layer 600. Peripheral section 610 may include a lattice structure 630 and open pores 632. In some embodiments, lattice structure 630 may be defined by woven or non-woven yarn. In some embodiments, grid layer 600 may include a bottom section 650 sized and shaped to form the bottom portion of grid layer 600. Bottom section 650 may include a lattice structure 670 and open pores 672. In some embodiments, lattice structure 670 may be defined by woven or non-woven yarn. In some embodiments, the orientation of the yarns in lattice structures 630/670 of grid layer 600 may provide desired strength and/or stretchability for areas of an upper.

In some embodiments, lattice structure 630 of peripheral section 610 and lattice structure 670 of bottom section 650 may be composed of the same material(s). In some embodiments, lattice structure 630 of peripheral section 610 and lattice structure 670 of bottom section 650 may be composed of different material(s) (or of the same material(s), but with different mechanical characteristics (e.g., stiffness)). In some embodiments, peripheral section 610 and bottom section 650 may be pieces of material cut from the same source material (e.g., a sheet or roll of material). In some embodiments, peripheral section 610 and bottom section 650 may be pieces of material cut from different source materials. In some embodiments, peripheral section 610 and bottom section 650 may be coupled together to form a three-dimensional shape corresponding to the shape of a human foot before or after being disposed over an inflatable bladder (e.g., inflatable bladder 220).

Peripheral section 610 may include a heel portion 612 for defining the portion of grid layer 600 that wraps around the heel of a wearer, a medial portion 614 for defining the medial side of grid layer 600, and a lateral portion 616 for defining the lateral side of grid layer 600. A top edge 620 of peripheral section 610 may define at least portion of an opening in grid layer 600 through which a wearer inserts his or her foot when putting on an article of footwear including grid layer 600. Top edge 620 may include a medial toe edge 622 and a lateral toe edge 624, which may be coupled together to define a toe end of grid layer 600 when grid layer 600 is folded into a three-dimensional shape corresponding to the shape of a human foot. Top edge 620 may also include a medial forefoot edge 626 and a lateral forefoot edge 628, which may be coupled together to define a forefoot portion of grid layer 600 when grid layer 600 is folded into a three-dimensional shape corresponding to the shape of a human foot. Edges of peripheral section 610 may be coupled together using, for example, stitching and/or an adhesive.

A bottom edge 618 of peripheral section 610 may be coupled to bottom section 650. For example, bottom edge 618 may be stitched and/or adhered to bottom section 650 at a peripheral edge 656 of bottom section 650. Bottom section 650 may include a forefoot portion 652 defining a forefoot area of bottom section 650 and a rearfoot portion 654 define a rearfoot area of bottom section 650.

While FIGS. 6A and 6B show a grid layer 600 sectioned into two pieces, grid layer 600 may be sectioned into a different number of pieces that may be coupled together to form a three-dimensional shape corresponding to the shape of a human foot, or a portion thereof. As a non-limiting example, peripheral section 610 may be replaced with two sections, one defining the medial side of grid layer 600 and one defining the lateral side of grid layer 600. Furthermore, in some embodiments, grid layer 600 may be a single piece of material like base layer 500. In some embodiments, grid layer 600 may be sized and shaped to for a three-dimensional shape corresponding to a portion of the shape of a human foot. For example, grid layer 600 may be sized and shaped to form a three-dimensional shape corresponding to a midfoot portion and a heel portion of a human foot.

In some embodiments, the lattice structure(s) of grid layer 600 (e.g., woven yarns) may be at least partially embedded within a matrix material. For example, lattice structure 630 of peripheral section 610 may be at least partially embedded within a matrix material 634 and lattice structure 670 of bottom section 650 may be at least partially embedded within a matrix material 674. Matrix material 634 and matrix material 674 may be the same or different. In some embodiments, the lattice structure(s) of grid layer 600 may be at least partially embedded within a base layer. In other words, the material of a base layer may include a grid layer embedded at least partially therein. In such embodiments, a combined base and grid layer may be cut from source material including a base layer serving as the matrix for a grid layer.

Figure 7:
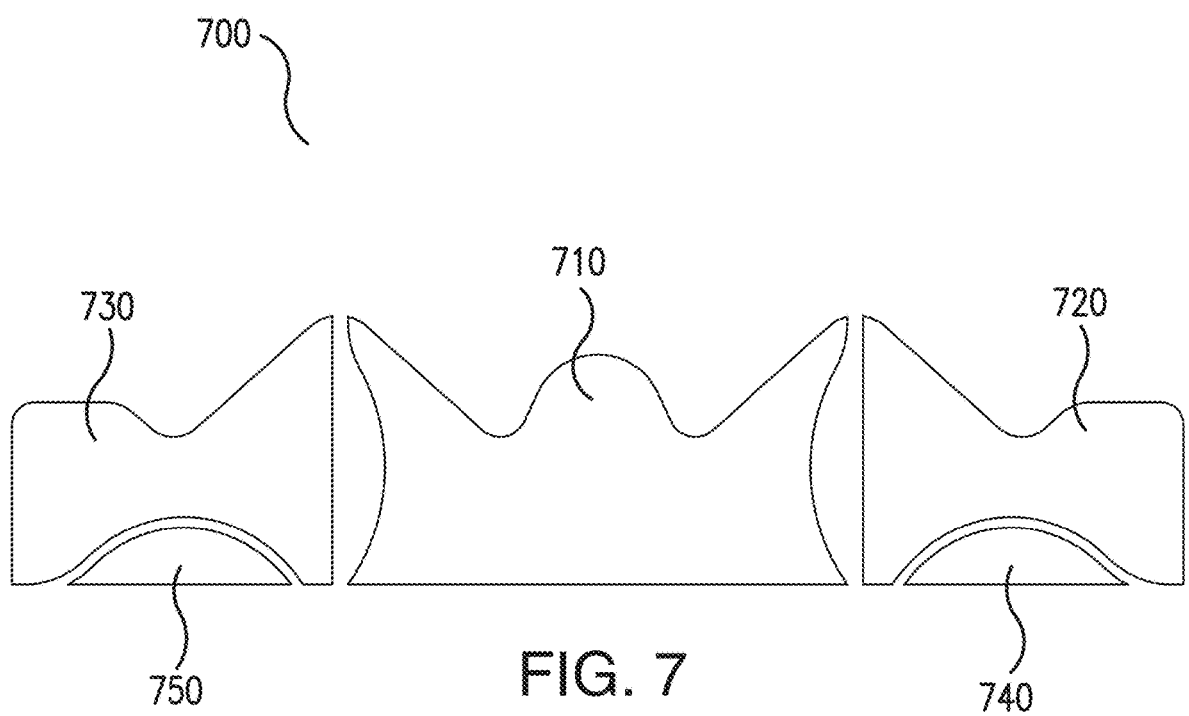
FIG. 7 shows various shell layers according to various embodiments.

FIG. 7 shows various shell layers 700 for skins according to various embodiments. Shell layers 700 may be composed of one or more low-melting point thermoplastic polymers. Shell layers 700 may be configured to provide one or more different characteristics to different areas of an upper.

FIG. 7 shows a heel shell layer 710, a top medial shell layer 720, a top lateral shell layer 730, a bottom medial shell layer 740, and a bottom lateral shell layer 750. The size and shape of shell layers 710, 720, 730, 740, and 750 shown in FIG. 7 are exemplary (see e.g., shell layers in FIGS. 12, 13, and 14 for other exemplary shapes). Shell layers 700 may be sized and shaped to cover various areas on an upper and provide such areas with desired characteristics. A skin may include any suitable number of shell layers 700. In some embodiments, different shell layers 700 may partially or fully overlap to provide desired characteristics to areas of an upper. In some embodiments, a shell layer 700 may be sized and shaped to cover the entirety of an upper (e.g., a shell layer 700 may have the same size and shape as base layer 400 or 500). In some embodiments, a shell layer 700 that covers the entirety of an upper may be disposed over all other layers of a skin to protect the other layers and prevent them from detaching during use.

In some embodiments, shell layers 700 may be configured to provide targeted strength and/or support for an upper. For example, heel shell layer 710 may provide additional support for a wearer's ankle. As another example, bottom medial shell layer 740 and a bottom lateral shell layer 750 may provide increased strength for an upper at locations corresponding to the proximal heads of an individual's metatarsals. Such locations may experience a large amount of stress during an athletic activity (e.g., when an individual cuts to the left or right). In some embodiments, shell layers 700 may be configured to provide targeted comfort and/or protection for an individual's feet. For example, heel shell layer 710 may be composed of a low melting point thermoplastic foam configured to provide additional cushioning for an individual's heel. As other example, top medial shell layer 720 and a top lateral shell layer 730 may be composed of a low melting point thermoplastic foam configured to provide additional cushioning and protection for the sides of an individual's feet. In some embodiments, the foam of shell layers may provide increased thermal insulation for areas of an individual's feet.

In some embodiments, the absence of shell layers on areas of an upper may provide desired characteristics for certain areas of an upper. For example, an upper may devoid of shell layers 700 at areas corresponding to areas of an individual's feet which experience the highest skin temperature and/or sweat production during an athletic activity. The absence of shell layers 700 at these locations may provide increased thermal conductivity and/or breathability at these locations. Areas of feet that may experience the highest skin temperature and/or sweat production are described in U.S. Pat. No. 8,910,313, which is incorporated herein in its entirety by reference thereto. In some embodiments, a shell layer 700 may include an open pore pattern as discussed in regards to grid layer 600 to provided desired characteristics to areas of an upper. In some embodiments, grid layer 600 and shell layers 700 may provide an upper with a desired texture and/or aesthetically appealing design or pattern. In some embodiments, shell layer(s) 700 may provide increased traction to portions of an article of footwear.

In some embodiments, shell layer(s) 700 may be employed to produce partial forming and/or variable heating of an upper. For example, a shell layer disposed on a forefoot portion of an upper and comprising an insulating material may heat at a slower rate compared to a different portion of an upper (e.g., a heel portion). The variable heating may result in less bonding between layers in the forefoot portion of the upper compared to the bonding of layers in the heel portion of the upper. Variation in the amount of bonding between layers on an upper may result in variable characteristics, such as breathability and thermal conductivity, for different portions of an upper.

FIG. 8A shows a skin 800 disposed over inflatable bladder 220 according to an embodiment. Skin 800 may include a base layer 810 (i.e., an innermost layer) disposed over inflatable bladder 220. A grid layer 820 may be disposed over base layer 810. In some embodiments, grid layer 820 may be in direct contact with base layer 810. Skin 800 may also include one or more shell layers 830 disposed over grid layer 820. In some embodiments, shell layer(s) 830 may be in direct contact with grid layer 820. In some embodiments, the order of grid layer 820 and shell layers 830 may be reversed (i.e., grid layer 820 may be disposed over shell layers 830). In some embodiments, skin 800 may include a plurality of grid layers 820. In some embodiments, one or more grid layers 820 may be disposed over shell layer(s) 830 and one or more grid layers 820 may be disposed between base layer 810 and shell layer(s) 830. In some embodiments, a low tact adhesive may be used to properly position grid layer(s) 820 and/or shell layer(s) 830 over base layer 810.

Figure 8B:
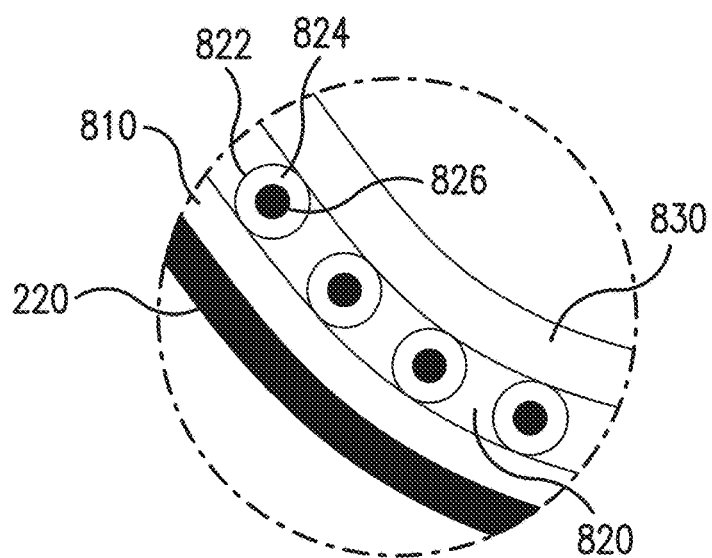
FIG. 8B is an enlarged cross-sectional view of various layers of a skin disposed over an inflatable bladder assembly according to an embodiment.

In some embodiments, as shown for example in FIG. 8B, grid layer 820 may include yarn 822 including a core 826 and a coating 824. In some embodiments, core 826 may be a polymeric fiber core. In some embodiments, core 826 may be composed of a high melting point thermoplastic polymer (e.g., thermoplastic polyurethane fiber). In some embodiments, coating 824 may be composed of a low melting point thermoplastic polymer (e.g., a low melting point polyester or polyamide). In embodiments including a coating 824 composed of a low melting point thermoplastic polymer, coating 824 may facilitate the bonding of yarn 822 to other layers (e.g., base layer 810 and/or shell layer(s) 830) during thermo-molding.

FIG. 9 shows a mold 900 for thermo-forming an upper according to an embodiment. Mold 900 may include a medial mold plate 910 including a medial mold cavity 912. Medial mold cavity 912 may have a medial mold cavity surface 914 having a shape corresponding to the shape of a medial half of an upper for an article of footwear. Mold 900 may also include a lateral mold plate 920 including a lateral mold cavity 922. Lateral mold cavity 922 may have a lateral mold cavity surface 924 having a shape corresponding to the shape of a lateral half of an upper for an article of footwear.

Together, medial mold cavity 912 and lateral mold cavity 922 may form a mold cavity having an interior shape corresponding to an upper for an article of footwear. The mold cavity may have an interior shape corresponding to an upper for various types of footwear, including but not limited to, a running shoe, a hiking shoe, a water shoe, a training shoe, a fitness shoe, a dancing shoe, a biking shoe, a tennis shoe, a cleat (e.g., a baseball cleat, a soccer cleat, or a football cleat), a basketball shoe, a boot, a walking shoe, a casual shoe, or a dress shoe.

As shown, for example, in FIGS. 10A and 10B, mold 900 may be assembled around skin 800 on inflatable bladder 220 (i.e., skin 800 and inflatable bladder 220 may be inserted into the mold cavity of mold 900). In some embodiments, the mold cavity of mold 900 may be coated with a non-stick material, such as but not limited to a silicone spray, to reduce potential adhesion between skin 800 and the mold cavity during forming. Before or after skin 800 and inflatable bladder 220 are inserted into the mold cavity, mold 900 may be heated to a predetermined temperature. The temperature of mold 900 may be such that it softens skin 800 to allow it to take on the shape of upper for an article of footwear. In some embodiments, the predetermined temperature may be below the melting point of the low melting point thermoplastic polymers of skin 800. In some embodiments, the predetermined temperature may be 180 degrees C. or less. In some embodiments, the predetermined temperature may be in the range of 180 degrees C. to 80 degrees C. In some embodiments, the predetermined temperature may be 160 degrees C. or less. In some embodiments, the predetermined temperature may be in the range of 160 degrees C. to 65 degrees C. In some embodiments, the predetermined temperature may be selected such that materials of skin 800 undergo no chemical reactions during thermo-forming an upper. Heat may be applied to mold 900 in one or more ways, such as but not limited to, high frequency heating.

After heating mold 900, inflatable bladder 220 may be expanded to press skin 800 into contact with the interior surface of the mold cavity defined by medial mold cavity 912 and lateral mold cavity 922. The combination of pressure and heat will cause skin to take on the shape of the interior surface of the mold cavity, thereby taking on the shape of an upper for an article of footwear. The layers of skin 800 closest to the interior surface of the mold cavity may experience the most about of heat, while the layers of skin furthest from the interior surface of the mold cavity (i.e., a base layer) may experience the least of amount of heat. In some embodiments, the material of base layer 810 may have a lower melting temperature than the materials of the other layers of skin 800. In some embodiments, the pressing of skin 800 against the mold cavity may result in grid layer 820 becoming partially embedded within base layer 810 and/or shell layer(s) 830. In other words, the material of base layer 810 and/or shell layer(s) 830 may at least partially fill open pores of grid layer 820. The temperature at which, pressure at which, and/or amount of time skin 800 is pressed against the interior shape of the mold cavity may be tailored to produce an upper having desired characteristics.

The mold cavity of mold 900 may be sized and shaped for a particular foot type and size (i.e., length and width). In some embodiments, the mold 900 may be a customized mold including a customized interior mold cavity surface. In some embodiments, mold 900 may be customized for a particular individual. In some embodiments, mold 900 may include a mold cavity created by digitally scanning a human foot. In some embodiments, mold 900 may include a customized mold cavity created by digitally scanning an individual's foot. In some embodiments, an individual's foot may be scanned using a CREAFORM Go!SCAN 3D scanner, Serial No: 570489, manufactured by Ametek Ultra Precision Technologies.

When thermo-forming of uppers for footwear as discussed herein, only mold(s) 900 may need to be interchanged to form different sizes, shapes, and/or types of uppers. The interchangeability and modularity of molds may reduce manufacturing costs by reducing the number of parts that need to changed/adjusted when forming uppers for different articles of footwear. Reducing the parts that need to changed/adjusted when forming uppers for different articles of footwear may facilitate the use of an automated process for thermo-forming uppers for articles of footwear. Further, it may facilitate cost-effective manufacturing of customized uppers.

As shown for example in FIG. 10C, after skin 800 takes on the shape of the mold cavity defined by medial mold cavity 912 and lateral mold cavity 922, inflatable bladder 220 may be deflated and an upper 1000 may be removed from the mold cavity. In some embodiments, excess material may be removed (e.g., cut) from upper 1000 to define the edges of upper 1000.

FIGS. 11A and 11B show an upper according to an embodiment. As shown for example in FIG. 11A, upper 1100 includes a forefoot end 1102, a heel end 1104, a medial side 1106, and a lateral side 1108 opposite medial side 1106. Also as shown in FIG. 11A, upper 1100 includes a forefoot portion 1110, a midfoot portion 1112, and a heel portion 1114. Portions 1110, 1112, and 1114 are not intended to demarcate precise areas of upper 1100. Rather, portions 1110, 1112, and 1114 are intended to represent general areas of upper 1100 that provide a frame of reference.

In some embodiments, upper 1100 may include a base layer 1120 and a grid layer 1130. Base layer 1120 may be the same as or similar to base layer 400 or 500. Grid layer 1130 may be the same as or similar to grid layer 600. For example, as shown in FIGS. 11A and 11B, grid layer 1130 may include a peripheral section 1140 coupled to a bottom section 1142 at a seam 1144 (e.g., via stitching and/or an adhesive). Peripheral section 1140 may wrapped about bottom section 1142, folded, and coupled at seam 1136 to form forefoot end 1102 and forefoot portion 1110 of upper 1100.

In some embodiments, grid layer 1130 may include yarns 1132 arranged in a pattern comprising open pores 1134. In some embodiments, grid layer 1130 may include yarns 1132 woven in a pattern comprising open pores 1134. Open pores 1134 may have varying size and/or pore density at different areas on upper 1100 to provide different characteristics to those areas. For example, as shown in FIGS. 11A and 11B, the pore size of pores 1134 may larger and the pore density of pores 1134 may be less in forefoot portion 1110 and heel portion 1114 of upper 1100 compared to midfoot portion 1112 of upper 1100. In such embodiments, upper 1100 may have greater breathability and stretchability in forefoot portion 1110 and heel portion 1114 compared to midfoot portion 1112. In such embodiments, the smaller pore size and higher pore density in midfoot portion 1112 may result in higher strength and less breathability in midfoot portion 1112 of upper 1100.

In some embodiments, the orientation of yarns 1132 may provide directional strength and/or stability to upper 1100. For example, some yarns 1132 of upper 1100 may be oriented such that they extend substantially vertically between a top edge 1141 of peripheral section 1140 and bottom section 1142 in heel portion 1114 and midfoot portion 1112 of upper 1100. This orientation of yarns 1132 may provide vertical strength and stability for upper 1100 in heel portion 1114 and midfoot portion 1112 to vertically support a wearer's ankle and inhibit the ankle form excessively twisting during an athletic activity.

FIG. 12 shows an upper 1200 according to an embodiment. Similar to upper 1100, upper 1200 includes a forefoot end 1202, a heel end 1204, a medial side 1206, and a lateral side 1208 opposite medial side 1206. Upper 1200 also includes a forefoot portion 1210, a midfoot portion 1212, and a heel portion 1214. Portions 1210, 1212, and 1214 are not intended to demarcate precise areas of upper 1200. Rather, portions 1210, 1212, and 1214 are intended to represent general areas of upper 1100 that provide a frame of reference.

In some embodiments, upper 1200 may include a base layer 1220 and a grid layer 1230. Base layer 1220 may be the same as or similar to base layer 400 or 500. Grid layer 1230 may be the same as or similar to grid layer 600. For example, grid layer 1230 may include a peripheral section 1240 coupled to a bottom section 1242.

In some embodiments, upper 1200 may include an ankle shell layer 1250, a heel shell layer 1252, and a metatarsal shell layer 1254. Ankle shell layer 1250 may provide increased support and/or protection for a wearer's ankle. Heel shell layer 1252 may provide additional strength for upper 1200 around a wearer's heel. Metatarsal shell layer 1254 may provide additional strength for upper 1200 at locations corresponding to the proximal head of an individual's first metatarsal (i.e., an individual's medial-most metatarsal).

FIG. 13 shows an upper 1300 according to an embodiment. Upper 1300 may include a base/grid layer 1320. Base/grid layer 1320 may include a base layer the same as or similar to base layer 400 or 500 and a grid layer the same as or similar to grid layer 600. In some embodiments, upper 1300 may include a rearfoot shell layer 1340, a top metatarsal shell layer 1342, and a bottom metatarsal shell layer 1344. In some embodiments, rearfoot shell layer 1340 may include an open pore layer like grid layer 600 (e.g., a woven layer) configured to provide increased support and/or protection for a wearer's ankle. Top metatarsal shell layer 1342 may provide additional strength for upper 1300 at a location corresponding to the proximal head an individual's fifth metatarsal (i.e., an individual's lateral-most metatarsal). Bottom metatarsal shell layer 1344 may provide additional cushioning for upper 1300 at a location corresponding to the proximal head of an individual's fifth metatarsal.

In some embodiments, upper 1300 may include a tongue 1350. In some embodiments, tongue 1350 may be defined by a portion of a skin used to thermo-form upper 1300. In some embodiments, tongue 1350 may be integrally formed with a layer of the skin (e.g., the base layer of the skin). In some embodiments, tongue 1350 may be coupled to the skin (e.g., via stitching and/or an adhesive) before thermo-forming. In some embodiments, tongue 1350 may be composed of a low melting point thermoplastic polymer. In some embodiments, tongue 1350 may be coupled to upper 1300 after it is thermo-molded.

In some embodiments, upper 1300 may include a sole wrap 1360. Sole wrap 1360 may be configured to facilitate the attachment of a sole to upper 1300. In some embodiments, sole wrap 1360 may include a sheet of material that may be disposed over at least a portion of a sole and bonded to the sole (see e.g., sole wrap 1516 in FIG. 15). In some embodiments, sole wrap 1360 may comprise a tape that provides traction, such as an athletic tape. In some embodiments, sole wrap 1360 may be the same as or similar to the second sole element discussed in U.S. application Ser. No. 14/683,616, filed Apr. 10, 2015, the disclosure of which is hereby incorporated by reference in its entirety by reference thereto. In some embodiments, sole wrap 1360 may be a separate layer coupled to upper 1300 using stitching, an adhesive, and/or thermo-molding. In some embodiments, sole wrap 1360 may be an integral part of one or more layers (e.g., base layer, grid layer, or shell layer) of upper 1300 (i.e. sole wrap 1360 may be an integral part of the skin of upper 1300).

In some embodiments, sole wrap 1360 may be disposed over a sole before the sole and a skin (e.g., skin 800) are inserted into a mold cavity of a (e.g., mold 900). In such embodiments, the sole may be three-dimensionally shaped along with the skin of upper 1300 in a single thermo-molding operation. In some embodiments, sole wrap 1360 and a sole may be coupled to upper 1300 in a second processing operation (e.g., a second thermo-molding operation) after a skin (e.g., skin 800) is three-dimensionally shaped into upper 1300 in a first thermo-molding operation.

FIG. 14 shows an article of footwear 1400 according to an embodiment. Article of footwear 1400 may include an upper 1410 coupled to a midsole 1430. Upper 1410 may include a body 1412 formed using a thermo-molding process discussed herein. For example, body 1412 may include a heel shell layer 1420 and a forefoot shell layer 1422. In some embodiments, a top edge of body 1412 may be lined with a cushioning liner 1414 to provide comfort for an individual's foot. In some embodiments, body 1412 may include shoe lace eyelets 1416 for a shoe lace.

In some embodiments, article of footwear 1400 may include an outsole 1432 coupled to midsole 1430. Suitable materials for midsole 1430 and outsole 1432 include, but are not limited to, a foam, a rubber, ethyl vinyl acetate (EVA), expanded Thermoplastic polyurethane (eTPU), Thermoplastic rubber (TPR) and a thermoplastic polyurethane (PU). In some embodiments, the foam may comprise, for example, an EVA based foam or a PU based foam and the foam may be an open-cell foam or a closed-cell foam. In some embodiments, midsole 1430 and/or outsole 1432 may comprise elastomers, thermoplastic elastomers (TPE), foam-like plastics, and gel-like plastics. In some embodiments, article of footwear 1400 may include a toe guard 1440. In some embodiments, article of footwear 1400 may include a tongue 1450.

FIG. 15 shows an exploded cross-sectional view of an article of footwear 1500 including an upper 1510 having a sole wrap according to an embodiment. As shown in FIG. 15, upper 1510 may include a first layer 1512 and a second layer 1514 defining a sole wrap 1516 disposed over at least a portion of a sole 1520. In some embodiments, second layer 1514 may be disposed over all or a portion of first layer 1512. In some embodiments, first layer 1512 may be a base layer as discussed herein. In such embodiments, second layer 1514 may be a grid layer or a shell layer as discussed herein. In some embodiments, first layer 1512 may be a skin comprising multiple layers as discussed herein. In such embodiments, second layer 1514 may be a separate layer disposed over at least a portion of first layer 1512. In some embodiments, second layer 1514 may be attached to first layer 1512 by stitching, an adhesive, and/or thermo-molding. In some embodiments, article of footwear 1500 may include multiple second layers 1514 defining multiple sole wraps 1516.

In some embodiments, sole 1520 may be a midsole. In some embodiments, article of footwear 1500 may include an outsole 1530 coupled to sole wrap 1516. Suitable materials for sole 1520 and outsole 1530 include, but are not limited to, a foam, a rubber, ethyl vinyl acetate (EVA), expanded Thermoplastic polyurethane (eTPU), Thermoplastic rubber (TPR) and a thermoplastic polyurethane (PU). In some embodiments, the foam may comprise, for example, an EVA based foam or a PU based foam and the foam may be an open-cell foam or a closed-cell foam. In some embodiments, sole 1520 and/or outsole 1530 may comprise elastomers, thermoplastic elastomers (TPE), foam-like plastics, and gel-like plastics.

Second layer 1514 may be arranged to at least partially cover sole 1520 to provide at least one of stability, support, and bending and torsional stiffness for article of footwear 1500. By disposing second layer 1514 over at least a portion of sole 1520, sole 1520 may be provided with increased stability and/or stiffness. In some embodiments, sole 1520 may be fully contained in second layer 1514. In some embodiments, sole 1520 may be partially exposed through second layer 1514. In some embodiments, second layer 1514 may be configured to provide increased traction to portions of article of footwear 1500.

In some embodiments, second layer 1514 may cover the bottom side, medial and lateral sides, and the forefoot and heel portions of sole 1520. In some embodiments, second layer 1514 may cover sole 1520 only partially. For example, second layer 1514 may cover only a forefoot portion, a midfoot portion, or a heel portion of sole 1520. As another example, second layer 1514 may cover only the lateral side, only the medial side, or both sides of sole 1520. Also, the mentioned portions may be only covered partially by second layer 1514. In some embodiments, second layer 1514 may completely cover sole 1520 and sole 1520 may be fully surrounded by second layer 1514. In some embodiments, second layer 1514 may specifically cover portions of sole 1520 where certain characteristics are desired, such as stability, torsional and/or bending stiffness, traction, friction, etc.

In some embodiments, second layer 1514 may comprise yarns. The yarns may be based on natural or manmade fibers including polyester, high tenacity polyester, polyamide, metal yarns, stretch yarns, carbon yarns, glass yarns, polyethylene or polyolefin yarns, bi-component yarns, polytetrafluoroethylene (PTFE) yarns, ultra-high-molecular-weight polyethylene yarns, liquid crystal polymer yarns, specialty decorative yarns or reflective yarns or any of these yarns coated with EVA hot melt, TPU, PU, rubber or otherwise coated with a polymer.

In some embodiments, second layer 1514 may comprise a textile material. For example, the textile material may be a knit textile (warp or weft knit), a braided material, a woven fabric, created by tailor fiber placement, etc. In some embodiments, the textile material may be a non-woven fabric made from suitable fibers. In some embodiments, second layer 1514 may comprise at least one first area with less stretch than an adjacent area. Second layer 1514 may further comprise at least one second area with more stiffness than an adjacent area, and/or at least one third area with more traction than an adjacent area, and/or at least one fourth area with a looser knit structure than an adjacent area, and/or at least one fifth area where the second sole element is thicker than in an adjacent area.

Some embodiments may include a method of manufacturing an upper for an article of footwear, the method including disposing an inflatable bladder around a last; disposing a skin over the inflatable bladder, the skin including at least one of: a base layer including a low melting point thermoplastic polymer and a grid layer including a yarn composed of a low melting point thermoplastic polymer; placing the assembled last, inflatable bladder, and skin within a cavity of a mold; heating the mold to a predetermined temperature; and inflating the inflatable bladder such that the skin is pressed against an interior surface of the heated mold cavity to cause the skin to take on the shape of the internal surface of the mold cavity onto which it is pressed, thereby forming an upper for an article of footwear.

In any of the various embodiments discussed herein, the predetermined temperature of the mold may be below a melting point of the low melting point thermoplastic polymers of the base layer and the grid layer. In any of the various embodiments discussed, herein the predetermined temperature may be 180 degrees C. or less.

In any of the various embodiments discussed herein, the low melting point thermoplastic polymers of a base layer and a grid layer may be selected from the group of: polyesters, polyamides, polyethylene, polyethylene foams, polyurethane foams, co-polymers thereof, and polymer blends thereof.

In any of the various embodiments discussed herein, a skin may include a base layer and the base layer may be a substantially mechanically isotropic material. In any of the various embodiments discussed herein, a skin may include a base layer and the base layer may be a substantially homogenous material.

In any of the various embodiments discussed herein, a skin may include a base layer and a grid layer and the grid layer may be disposed over the base layer.

In any of the various embodiments discussed herein, a skin may include a grid layer and the yarn of the grid layer may include thermoplastic polyurethane. In any of the various embodiments discussed herein, a skin may include a grid layer and the yarn of the grid layer may be woven and include a woven pattern having areas with different yarn densities configured to provide one or more different characteristics to different areas of an upper. In any of the various embodiments discussed herein, a skin may include a grid layer and the grid layer may include a pattern having areas with different open pore densities configured to provide one or more different characteristics to different areas of the upper.

In any of the various embodiments discussed herein, a skin may include a base layer and disposing the skin over an inflatable bladder may include disposing one or more shell layers including a low melting point thermoplastic polymer over at least a portion of the base layer. In any of the various embodiments discussed herein, a skin may include a grid layer and disposing the skin over an inflatable bladder may include disposing one or more shell layers including a low melting point thermoplastic polymer over at least a portion of the grid layer.

In any of the various embodiments discussed herein, a method of manufacturing an upper for an article of footwear may include disposing a release liner between an inflatable bladder and a skin.

In any of the various embodiments discussed herein, a method of manufacturing an upper for an article of footwear may include a mold that is a customized mold including a customized interior surface. In any of the various embodiments discussed herein, a mold may be a customized mold including a customized interior surface for a particular individual. In any of the various embodiments discussed herein, a mold may be a customized mold including a customized interior surface for a particular foot type and size. In any of the various embodiments discussed herein, a customized mold may be created by digitally scanning an individual's foot.

In any of the various embodiments discussed herein, a method of manufacturing an upper for an article of footwear may include deflating an inflatable bladder and removing the upper from a mold cavity. In any of the various embodiments discussed herein, a method of manufacturing an upper for an article of footwear may include cutting the upper to remove excess material.

Some embodiments may include an upper for an article of footwear made by disposing an inflatable bladder around a last; disposing a skin over the inflatable bladder, the skin including at least one of: a base layer including a low melting point thermoplastic polymer and a grid layer including a yarn composed of a low melting point thermoplastic polymer; placing the assembled last, inflatable bladder, and skin within a cavity of a mold; heating the mold to a predetermined temperature; and inflating the inflatable bladder such that the skin is pressed against an interior surface of the heated mold cavity to cause the skin to take on the shape of the internal surface of the mold cavity onto which it is pressed, thereby forming an upper for an article of footwear.

Some embodiments may include a method of manufacturing an upper for an article of footwear, the method including disposing an inflatable bladder around a last; disposing a skin over the inflatable bladder, the skin including a layer including a low melting point thermoplastic polymer; placing the assembled last, inflatable bladder, and skin within a cavity of a mold; heating the mold to a predetermined temperature less than or equal to 180 degrees C.; and inflating the inflatable bladder such that the skin is pressed against an interior surface of the heated mold cavity to cause the skin to take on the shape of the internal surface of the mold cavity onto which it is pressed, thereby forming an upper for an article of footwear.

In any of the various embodiments discussed herein, a low melting point thermoplastic polymer may be selected from the group of: polyesters, polyamides, polyethylene, polyethylene foams, polyurethane foams, co-polymers thereof, and polymer blends thereof.

In any of the various embodiments discussed herein, a layer including a low melting point thermoplastic polymer may include a yarn composed of a low melting point thermoplastic polymer. In any of the various embodiments discussed herein, a yarn may include a core composed of a high melting point thermoplastic polymer coated with a low melting point thermoplastic polymer.

In any of the various embodiments discussed herein, a low melting point thermoplastic polymer may have a melting point of 200 degrees C. or less.

Some embodiments may include an upper for an article of footwear, the upper including a single integrally molded skin defining a forefoot portion, a midfoot portion, and a rearfoot portion of the upper, the skin including at least one of: a base layer defining a forefoot portion, a midfoot portion, and a rearfoot portion of the upper and including a low melting point thermoplastic polymer; and a grid layer including of a yarn composed of a low melting point thermoplastic polymer.

In any of the various embodiments discussed herein, an upper may include a shell layer including a low melting point thermoplastic polymer.

In any of the various embodiments discussed herein, the low melting point thermoplastic polymers of a base layer and a grid layer have melting points of 200 degrees C. or less.

In any of the various embodiments discussed herein, a skin may include a base layer and the base layer may be a substantially mechanically isotropic material. In any of the various embodiments discussed herein, a skin may include a base layer and the base layer may be a substantially homogenous material.

In any of the various embodiments discussed herein, a skin may include a base layer and a grid layer and the grid layer may be at least partially embedded within the base layer.

In any of the various embodiments discussed herein, a skin may include a grid layer and the yarn of the grid layer may be composed of thermoplastic polyurethane.

In any of the various embodiments discussed herein, a skin may include a grid layer and the grid layer may include a pattern including areas with different open pore densities configured to provide one or more different characteristics to different areas of the upper. In any of the various embodiments discussed herein, the characteristics for different areas of an upper may be selected from the group of: breathability, strength, thermal conductivity, and stretchability.

In any of the various embodiments discussed herein, a skin may include a grid layer and the grid layer may be a woven layer. In any of the various embodiments discussed herein, a woven layer may include a woven pattern including areas with different yarn densities configured to provide one or more different characteristics to different areas of an upper.

In any of the various embodiments discussed herein, a skin may include a base layer and a grid layer.

In any of the various embodiments discussed herein, an upper may include a plurality of grid layers disposed over the base layer. In any of the various embodiments discussed herein, an upper may include a plurality of shell layers including a low melting point thermoplastic polymer disposed over a grid layer. In any of the various embodiments discussed herein, an upper may include a plurality of shell layers that provide one or more different characteristics to different areas of the upper. In any of the various embodiments discussed herein, one or more of the shell layers may be a foam layer for providing cushioning to certain areas of the upper.

In any of the various embodiments discussed herein, an upper may include a single integrally molded skin that defines a tongue of the upper.

Some embodiments may include an article of footwear including a midsole coupled to an upper, the upper including a single integrally molded skin defining a forefoot portion, a midfoot portion, and a rearfoot portion of the upper, the skin including at least one of: a base layer defining a forefoot portion, a midfoot portion, and a rearfoot portion of the upper and including a low melting point thermoplastic polymer; and a grid layer including of a yarn composed of a low melting point thermoplastic polymer.

In any of the various embodiments discussed herein, the midsole may be coupled to an upper by a sole wrap. In any of the various embodiments discussed herein, a sole wrap may be disposed around at least a portion of a midsole. In any of the various embodiments discussed herein, a sole wrap may be an integral part of a skin of an upper.

Some embodiments may include an upper for an article of footwear, the upper including a single integrally molded skin defining a forefoot portion, a midfoot portion, and a rearfoot portion of the upper, the skin including a yarn composed of a low melting point thermoplastic polymer.

In any of the various embodiment discussed herein, a yarn composed of a low melting point thermoplastic polymer may include a core composed of a high melting point thermoplastic polymer coated with a low melting point thermoplastic polymer.

In any of the various embodiments discussed herein, an upper may include a base layer defining a portion of the forefoot portion, the midfoot portion, and the rearfoot portion of the upper, the base layer including a low melting point thermoplastic polymer.

In any of the various embodiments discussed herein, a yarn composed of a low melting point thermoplastic polymer may be disposed over a base layer. In any of the various embodiments discussed herein, a yarn composed of a low melting point thermoplastic polymer may be at least partially embedded in a base layer.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention(s) and the appended claims in any way.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. A method of manufacturing an upper for an article of footwear, the method comprising:

disposing an inflatable bladder around a last;
disposing a skin over the inflatable bladder, the skin comprising:
a base layer comprising a mechanically isotropic material layer comprising a mechanical material property that is the same in all directions and comprising a low melting point thermoplastic polymer having a melting point of 200 degrees C. or less, and
a grid layer comprising yarn comprising a low melting point thermoplastic polymer having a melting point of 200 degrees C. or less, the yarn defining a porous structure comprising open pores, and wherein the grid layer is disposed over the base layer;
placing the assembled last, inflatable bladder, and skin within a cavity of a mold;
heating the mold to a predetermined temperature; and
inflating the inflatable bladder such that the skin is pressed against an interior surface of the heated mold cavity to cause the skin to take on the shape of the interior surface of the mold cavity onto which it is pressed, thereby forming an upper for an article of footwear.

2. The method of claim 1, wherein the predetermined temperature is below a melting point of the low melting point thermoplastic polymers of the base layer and the grid layer.

3. The method of claim 1, wherein the predetermined temperature is 180 degrees C. or less.

4. The method of claim 1, wherein the low melting point thermoplastic polymers of the base layer and the grid layer are selected from the group consisting of: polyesters, polyamides, polyethylene, polyethylene foams, polyurethane foams, co-polymers thereof, and polymer blends thereof.

5. The method of claim 1, wherein the mechanically isotropic material layer of the base layer is a homogenous material layer.

6. The method of claim 1, wherein the yarn of the grid layer comprises thermoplastic polyurethane.

7. The method of claim 1, wherein the yarn of the grid layer is woven and comprises a woven pattern comprising areas with different yarn densities configured to provide one or more different characteristics to different areas of the upper.

8. The method of claim 1, wherein the grid layer comprises a pattern comprising areas with different open pore densities configured to provide one or more different characteristics to different areas of the upper.

9. The method of claim 1, wherein disposing the skin over the inflatable bladder comprises disposing one or more shell layers comprising a low melting point thermoplastic polymer over at least a portion of the base layer.

10. The method of claim 1, wherein disposing the skin over the inflatable bladder comprises disposing one or more shell layers comprising a low melting point thermoplastic polymer over at least a portion of the grid layer.

11. The method of claim 1, wherein the mold is a customized mold comprising a customized interior surface for a particular individual.

12. The method of claim 1, wherein the mold is a customized mold comprising a customized interior surface for a particular foot type and size.

13. An upper for an article of footwear comprising an upper made by the method of claim 1.

14. The method of claim 1, wherein the yarn comprises a core comprising a high melting point thermoplastic polymer having a melting point above 200 degrees C. and wherein the core is coated with the low melting point thermoplastic polymer.

15. The method of claim 1, wherein the predetermined temperature is in the range of 65 degrees C. to 180 degrees C.

16. A method of manufacturing an upper for an article of footwear, the method comprising:
- disposing an inflatable bladder around a last;
- disposing a skin over the inflatable bladder, the skin comprising:
  - a base layer comprising a mechanically isotropic material layer comprising a mechanical material property that is the same in all directions, and comprising a low melting point thermoplastic polymer having a melting point of 200 degrees C. or less, and
  - a grid layer comprising yarn comprising a low melting point thermoplastic polymer having a melting point of 200 degrees C. or less, the yarn defining a porous structure comprising open pores, and wherein the grid layer is disposed over the base layer;
- placing the assembled last, inflatable bladder, and skin within a cavity of a mold;
- heating the mold to a predetermined temperature; and
- inflating the inflatable bladder such that the skin is pressed outward from the last and against an interior surface of the heated mold cavity to cause the skin to take on the shape of the interior surface of the mold cavity onto which it is pressed, thereby forming an upper for an article of footwear.

* * * * *